United States Patent
Miyake

(10) Patent No.: US 9,870,106 B2
(45) Date of Patent: Jan. 16, 2018

(54) MATRIX OF SENSOR UNITS EACH COMPRISING A FIRST SENSING ELEMENT AND A SECOND SENSING ELEMENT

(71) Applicant: Semiconductor Energy Laboratory Co., Ltd., Atsugi-shi, Kanagawa-ken (JP)

(72) Inventor: Hiroyuki Miyake, Kanagawa (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 15 days.

(21) Appl. No.: 14/643,285

(22) Filed: Mar. 10, 2015

(65) Prior Publication Data

US 2015/0261352 A1 Sep. 17, 2015

(30) Foreign Application Priority Data

Mar. 13, 2014 (JP) .................. 2014-050743

(51) Int. Cl.
  G06F 3/044 (2006.01)
  G06F 3/042 (2006.01)
  G06F 3/041 (2006.01)

(52) U.S. Cl.
  CPC .............. *G06F 3/044* (2013.01); *G06F 3/042* (2013.01); *G06F 3/0412* (2013.01); *G06F 2203/04106* (2013.01)

(58) Field of Classification Search
  CPC ................... G06F 3/044; G06F 3/0421; G06F 2203/04106; G06F 3/0412; G06F 3/042
  See application file for complete search history.

(56) References Cited

U.S. PATENT DOCUMENTS

| 5,847,690 | A | 12/1998 | Boie et al. |
|---|---|---|---|
| 6,392,617 | B1 | 5/2002 | Gleason |
| 7,423,639 | B2 | 9/2008 | Min |
| 8,411,045 | B2 | 4/2013 | Futter |
| 8,441,459 | B2 | 5/2013 | Chen et al. |
| 8,610,155 | B2 | 12/2013 | Hatano et al. |
| 8,723,835 | B2 | 5/2014 | Chiu et al. |
| 8,803,791 | B2 | 8/2014 | Sugita et al. |

(Continued)

FOREIGN PATENT DOCUMENTS

| JP | 2010-153813 | 7/2010 |
|---|---|---|
| JP | 2012-190794 | 10/2012 |

*Primary Examiner* — Temesghen Ghebretinsae
*Assistant Examiner* — Ivelisse Martinez Quiles
(74) *Attorney, Agent, or Firm* — Fish & Richardson P.C.

(57) ABSTRACT

A novel input device that is highly convenient or reliable or a novel input/output device that is highly convenient or reliable. The following structure is contemplated. The input device includes sensor units that are arranged in a matrix and each include a window portion which transmits visible light, a light-transmitting first sensing element which includes an insulating layer and a pair of electrodes between which the insulating layer is interposed and overlaps with the window portion, a second sensing element which includes a photoelectric conversion element and does not overlap with the window portion, and a sensing circuit which supplies a sensing signal on the basis of a change in the parasitic capacitance of the first sensing element or on the basis of the current flowing through the second sensing element; and a base layer supporting the sensor units.

9 Claims, 13 Drawing Sheets

(56) References Cited

U.S. PATENT DOCUMENTS

| | | |
|---|---|---|
| 2007/0093007 A1 | 4/2007 | Deane |
| 2008/0297487 A1* | 12/2008 | Hotelling ................ G06F 3/044 345/173 |
| 2010/0134426 A1* | 6/2010 | Lee ....................... G06F 3/0412 345/173 |
| 2010/0156847 A1* | 6/2010 | No ........................ G06F 3/0421 345/175 |
| 2011/0248961 A1* | 10/2011 | Svajda .................. G01S 3/7803 345/175 |
| 2012/0217516 A1 | 8/2012 | Hatano et al. |
| 2013/0222584 A1* | 8/2013 | Aoki ...................... H04N 5/335 348/143 |
| 2014/0043546 A1 | 2/2014 | Yamazaki et al. |
| 2014/0063368 A1 | 3/2014 | Yamazaki et al. |
| 2014/0354597 A1* | 12/2014 | Kitchens, II .......... G06F 3/0421 345/175 |
| 2015/0144920 A1 | 5/2015 | Yamazaki et al. |
| 2015/0255518 A1 | 9/2015 | Watanabe et al. |
| 2015/0261332 A1 | 9/2015 | Nakamura et al. |
| 2015/0355763 A1* | 12/2015 | Miyake ................ G06F 3/0412 345/174 |

\* cited by examiner

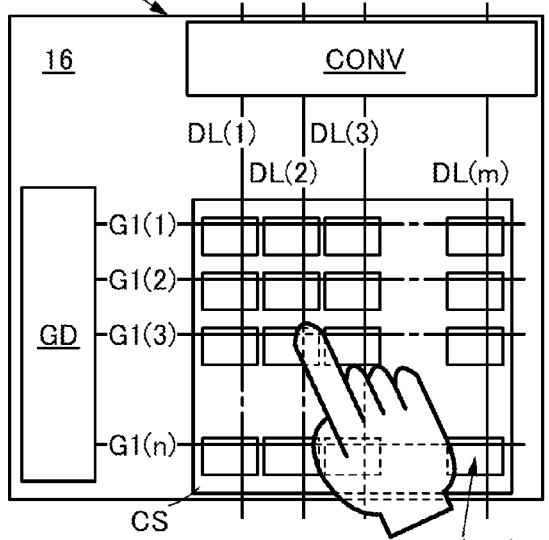
FIG. 3A
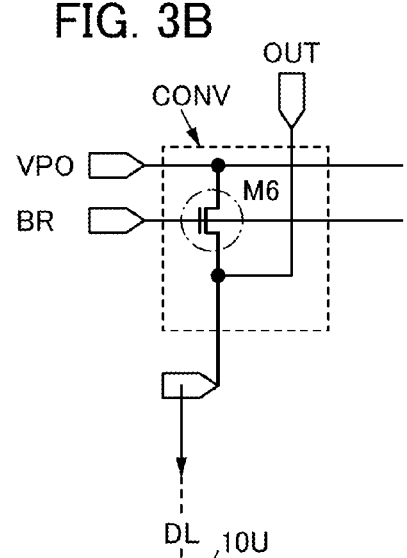
FIG. 3B
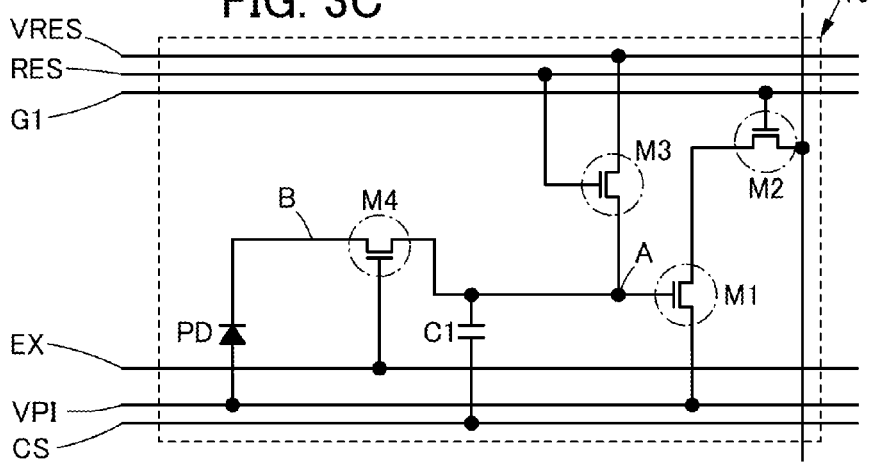
FIG. 3C
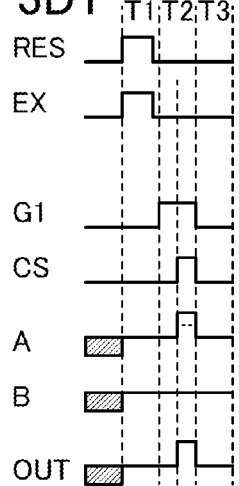
FIG. 3D1
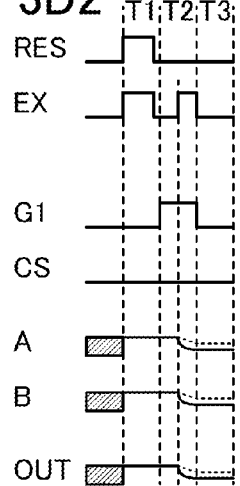
FIG. 3D2

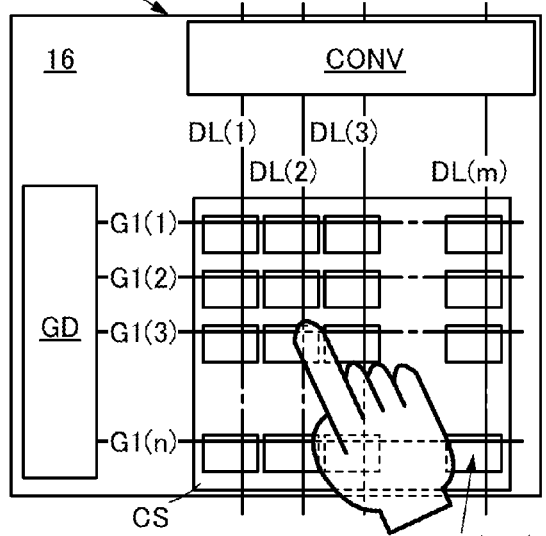
FIG. 4A
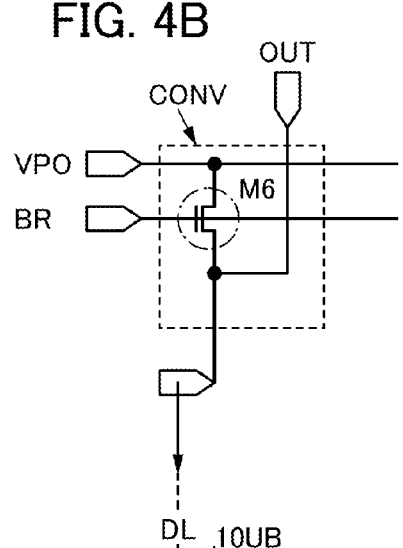
FIG. 4B
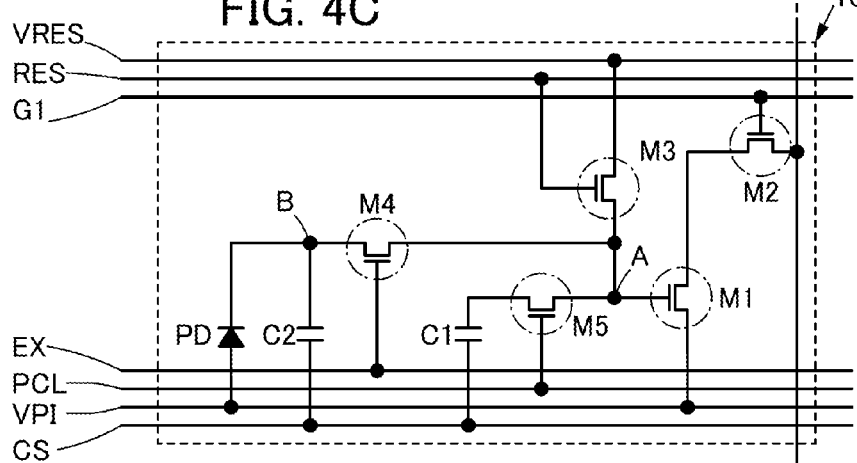
FIG. 4C
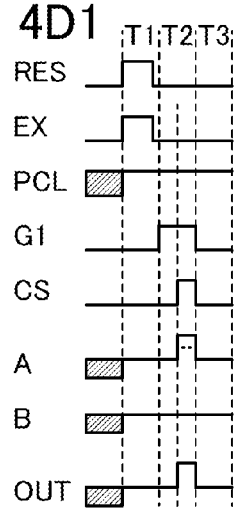
FIG. 4D1
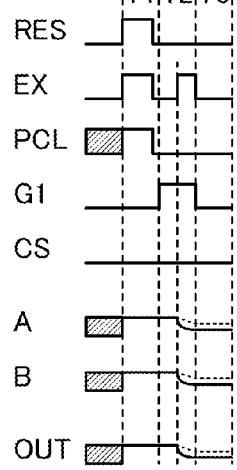
FIG. 4D2

FIG. 8A1
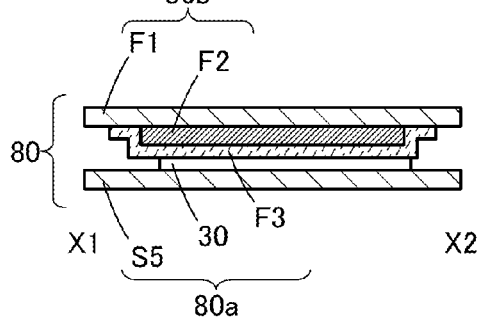
FIG. 8A2
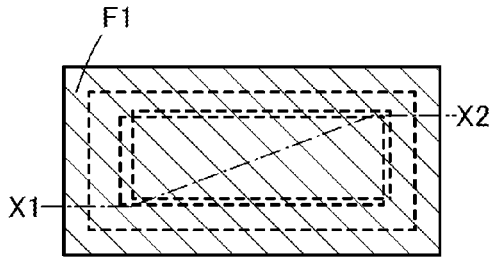
FIG. 8B1
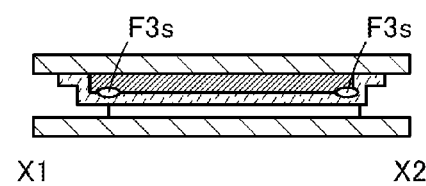
FIG. 8B2
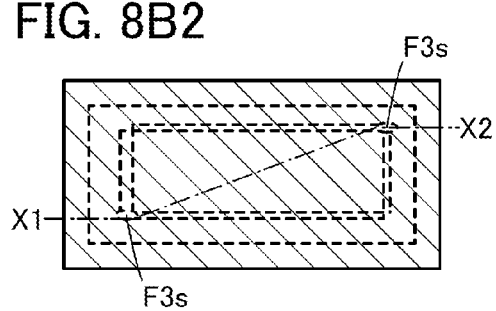
FIG. 8C
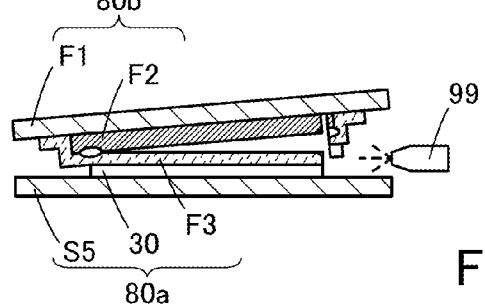
FIG. 8D1
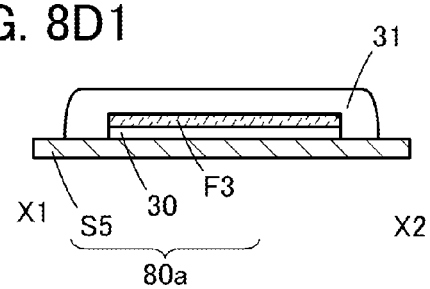
FIG. 8D2
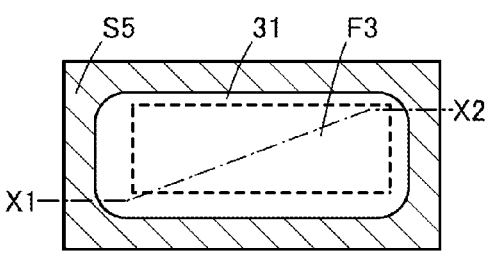
FIG. 8E1
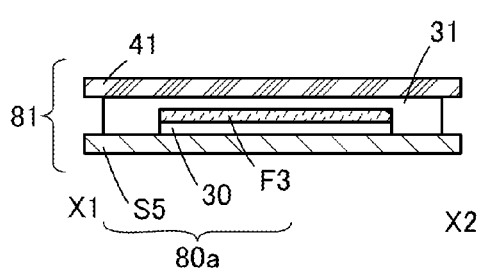
FIG. 8E2
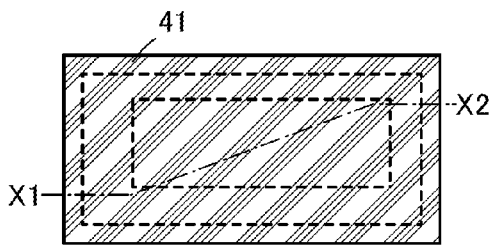

FIG. 9A1 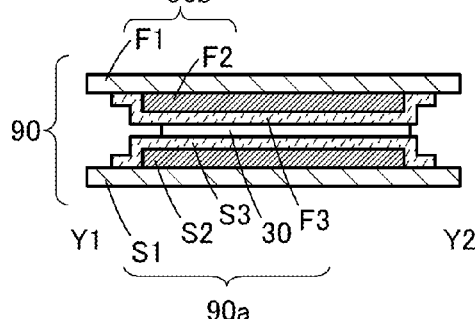
FIG. 9A2 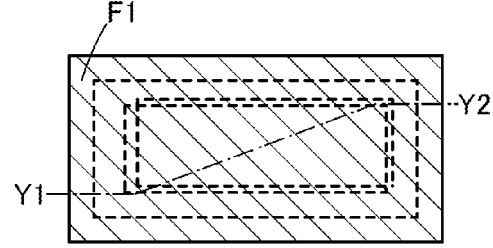
FIG. 9B1 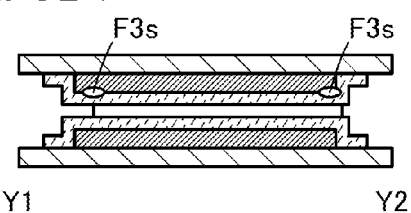
FIG. 9B2 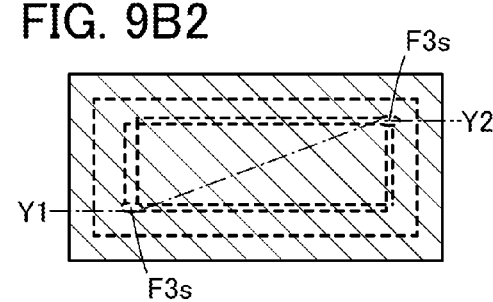

FIG. 9D1 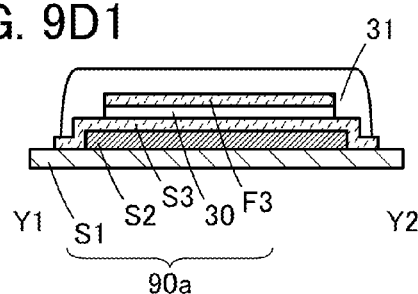
FIG. 9D2 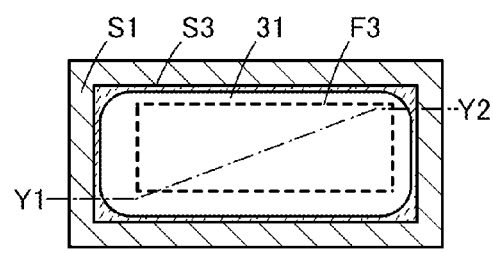
FIG. 9E1 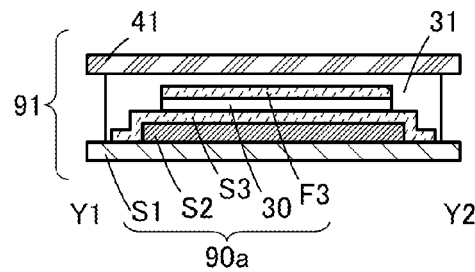
FIG. 9E2 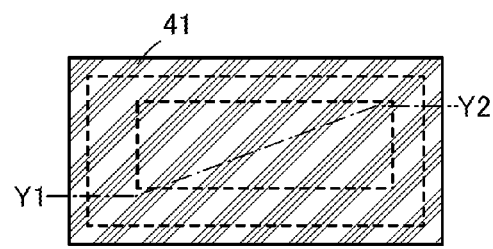

FIG. 10A1
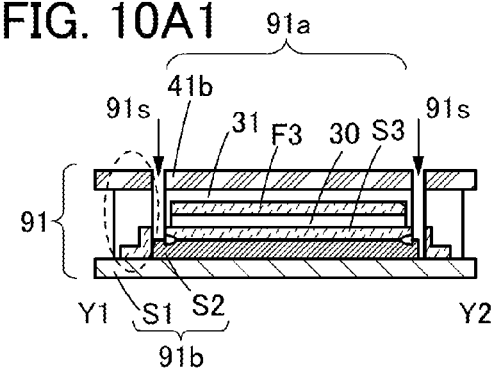
FIG. 10A2
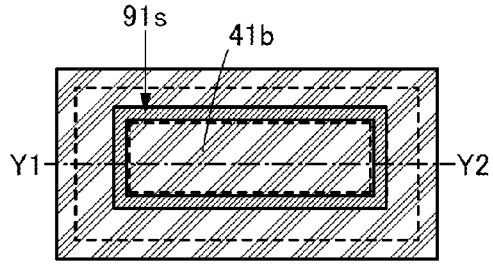
FIG. 10B
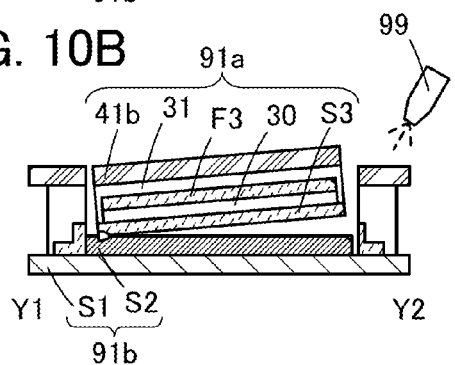
FIG. 10C
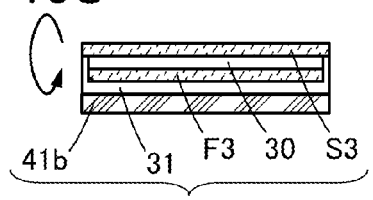
FIG. 10D1
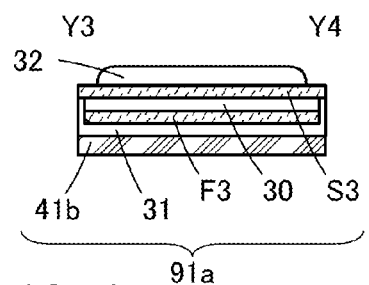
FIG. 10D2
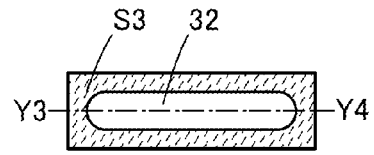
FIG. 10E1
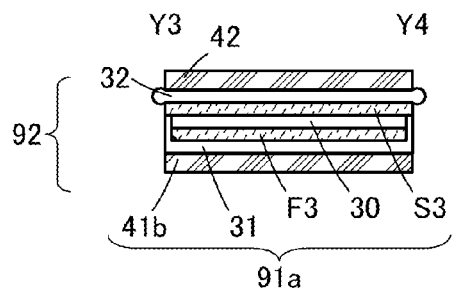
FIG. 10E2
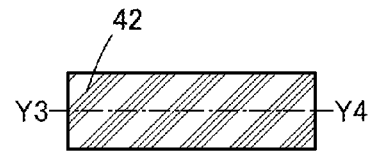

FIG. 11A1
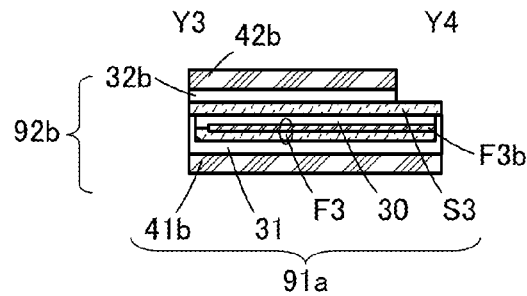
FIG. 11A2
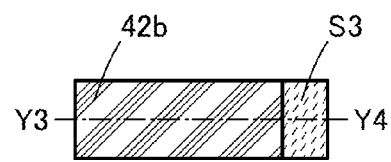
FIG. 11B1
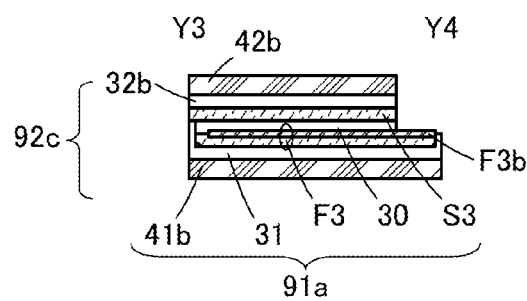
FIG. 11B2
FIG. 11C1
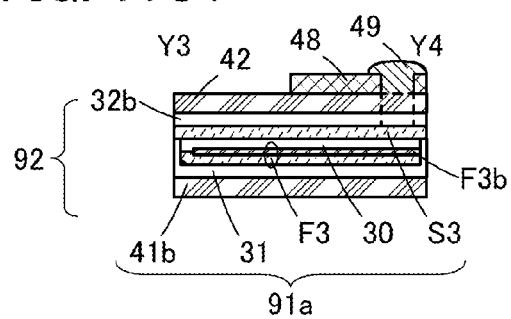
FIG. 11C2
FIG. 11D1
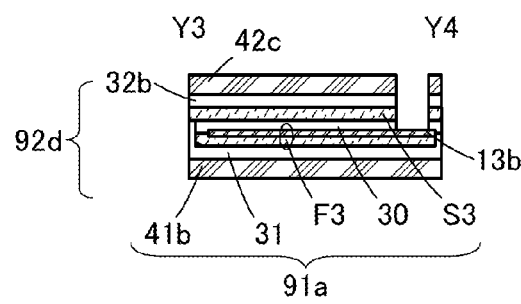
FIG. 11D2
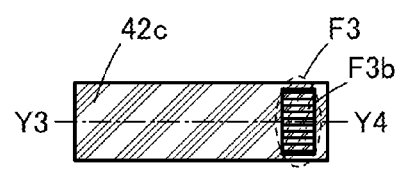

FIG. 12A1
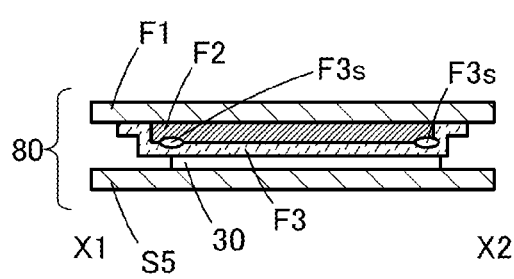
FIG. 12A2
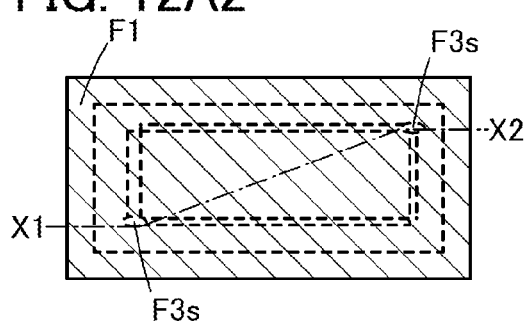
FIG. 12B1
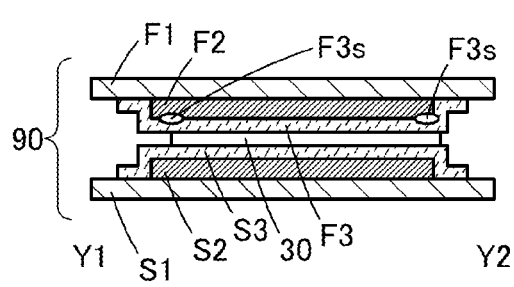
FIG. 12B2
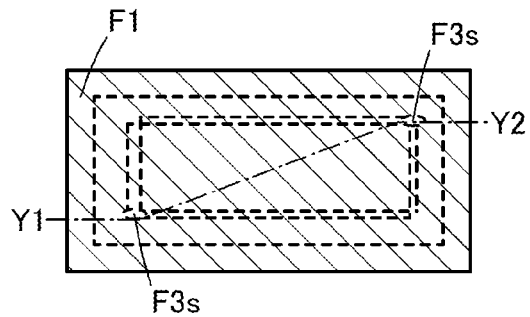

MATRIX OF SENSOR UNITS EACH COMPRISING A FIRST SENSING ELEMENT AND A SECOND SENSING ELEMENT

BACKGROUND OF THE INVENTION

1. Field of the Invention

One embodiment of the present invention relates to a sensor, an input device, or an input/output device.

Note that one embodiment of the present invention is not limited to the above technical field. The technical field of one embodiment of the invention disclosed in this specification and the like relates to an object, a method, or a manufacturing method. In addition, one embodiment of the present invention relates to a process, a machine, manufacture, or a composition of matter. Specifically, examples of the technical field of one embodiment of the present invention disclosed in this specification include a semiconductor device, a display device, a light-emitting device, a power storage device, a memory device, a method of driving any of them, and a method of manufacturing any of them.

2. Description of the Related Art

The social infrastructures relating to means for transmitting data have advanced. This has made it possible to acquire, process, and send out various kinds and plenty of data with the use of a data processing device not only at home or office but also at other visited places.

In this situation, portable data processing devices are under active development.

For example, a data processing device is often used while being carried around, and force might be accidentally applied to the data processing device and a display device used in it in case of drop. As an example of a display device that is not easily broken, a display device having high adhesiveness between a structure body by which a light-emitting layers are partitioned and a second electrode layer is known (Patent Document 1).

For example, a cellular phone in which a display device is placed on the front face of a housing and on the upper portion in the longitudinal direction is known (Patent Document 2).

REFERENCES

Patent Documents

[Patent Document 1] Japanese Published Patent Application No. 2012-190794
[Patent Document 2] Japanese Published Patent Application No. 2010-153813

SUMMARY OF THE INVENTION

An object of one embodiment of the present invention is to provide a novel input device that is highly convenient or reliable. Another object is to provide a novel input/output device that is highly convenient or reliable. Another object is to provide a novel sensor, a novel input device, a novel input/output device, or a novel semiconductor device.

Note that the descriptions of these objects do not preclude the existence of other objects. In one embodiment of the present invention, there is no need to achieve all the objects. Other objects will be apparent from and can be derived from the description of the specification, the drawings, the claims, and the like.

One embodiment of the present invention is an input device including a plurality of sensor units arranged in a matrix, scan lines which are placed along the row direction and to which the plurality of sensor units are electrically connected, signal lines which are placed along the column direction and to which the plurality of sensor units are electrically connected, and a base layer provided with the sensor units, the scan lines, and the signal lines.

In addition, the sensor unit includes a window portion which transmits visible light, a first sensing element overlapping with the window portion, a second sensing element not overlapping with the window portion, and a sensing circuit which is electrically connected to the first sensing element and the second sensing element and does not overlap with the window portion.

The first sensing element includes an insulating layer, and a first electrode and a second electrode between which the insulating layer is interposed.

The second sensing element includes a photoelectric conversion element. The sensing circuit is supplied with a selection signal and supplies a sensing signal on the basis of a change in the parasitic capacitance of the first sensing element or on the basis of the current flowing through the second sensing element Through the scan line, the selection signal can be supplied. Through the signal line, the sensing signal can be supplied.

The above input device of one embodiment of the present invention includes the sensor units that are arranged in a matrix and each include the window portion which transmits visible light, the light-transmitting first sensing element which includes the insulating layer and the first electrode and the second electrode between which the insulating layer is interposed and overlaps with the window portion, the second sensing element which includes a photoelectric conversion element and does not overlap with the window portion, and the sensing circuit which supplies the sensing signal on the basis of a change in the parasitic capacitance of the first sensing element or on the basis of the current flowing through the second sensing element; and the base layer supporting the sensor units.

The parasitic capacitance of the first sensing element is changed when an object gets close to the first electrode or the second electrode of the first sensing element or when the gap between the first electrode and the second electrode is changed, for example. The electromotive force of the second sensing element is changed when the intensity of received light is changed.

Thus, the sensor unit can supply the sensing signal so that the sensing signal can be associated with the position of the sensor unit, and the sensor unit can transmit visible light. Consequently, a novel input device that is highly convenient or reliable can be provided.

One embodiment of the present invention is the above input device in which the sensing circuit includes a first transistor, a first switch, a second switch, a third switch, the first sensing element, and the second sensing element.

In the first transistor, a gate is electrically connected to the first electrode of the first sensing element, and a first electrode of the first transistor is electrically connected to a wiring through which a ground potential can be supplied.

In the first switch, a control terminal is electrically connected to a wiring through which the selection signal can be supplied, a first terminal is electrically connected to a second electrode of the first transistor, and a second terminal of the first switch is electrically connected to the wiring through which the sensing signal can be supplied.

In the second switch, a control terminal is electrically connected to a wiring through which a reset signal can be supplied, a first terminal is electrically connected to the first electrode of the first sensing element, and a second terminal is electrically connected to a wiring through which a potential at which the first transistor is turned on can be supplied.

In the third switch, a control terminal is electrically connected to a wiring through which the light exposure control signal can be supplied and a first terminal of the third switch is electrically connected to the first electrode of the first sensing element.

In the second sensing element, a first electrode is electrically connected to a second electrode of the third switch and a second electrode of the second sensing element is electrically connected to the wiring through which the ground potential can be supplied.

One embodiment of the present invention is the above input device in which the sensing circuit includes the first transistor, the first switch, the third switch, a fourth switch, the first sensing element, the second sensing element, and a capacitor.

In the first transistor, the first electrode is electrically connected to the wiring through which the ground potential can be supplied.

In the first switch, the control terminal is electrically connected to the wiring through which the selection signal can be supplied, the first terminal of the first switch is electrically connected to the second electrode of the first transistor, and the second terminal of the first switch is electrically connected to the wiring through which the sensing signal can be supplied.

In the second switch, the control terminal is electrically connected to the wiring through which a reset signal can be supplied, the first terminal of the second switch is electrically connected to the gate of the first transistor, and the second terminal of the second switch is electrically connected to the wiring through which the potential at which the first transistor is turned on can be supplied.

In the third switch, the control terminal is electrically connected to the wiring through which the light exposure control signal can be supplied and the first terminal of the third switch is electrically connected to the gate of the first transistor.

In the fourth switch, a control terminal is electrically connected to a wiring through which a mode switching signal can be supplied, and a first terminal of the fourth switch is electrically connected to the gate of the first transistor In the first sensing element, the first electrode is electrically connected to a second electrode of the fourth switch, and the second electrode of the first sensing element is electrically connected to the wiring through which the ground potential can be supplied.

In the second sensing element, the first electrode is electrically connected to a second terminal of the third switch, and the second electrode of the second sensing element is electrically connected to the wiring through which the ground potential can be supplied.

In the capacitor, a first electrode is electrically connected to the second terminal of the third switch, and a second electrode of the capacitor is electrically connected to the wiring through which the ground potential can be supplied.

The above input device of one embodiment of the present invention includes the plurality of sensor units including the first sensing element, the second sensing element, and the sensing circuit. Each sensing circuit includes the first transistor comprising a gate electrically connected to the first electrode of the first sensing element, and to the first electrode of the second sensing element via the third switch.

Thus, through the first transistor, the sensing signal based on a change in capacitance or a change in electromotive force can be supplied to one signal line. As a result, positional data of a sensor unit and the sensing signal from the sensor unit can be supplied, and visible light can be transmitted. Consequently, a novel input device that is highly convenient or reliable can be provided.

One embodiment of the present invention includes an input device including a plurality of sensor units which includes window portions transmitting visible light and are arranged in a matrix, scan lines which are placed along the row direction and to which the plurality of sensor units are electrically connected, signal lines which are placed along the column direction and to which the plurality of sensor units are electrically connected, and a first base layer provided with the plurality of sensor units, the scan lines, and the signal lines; and includes a display portion including a plurality of pixels that are arranged in a matrix and overlap with the window portions and a second base layer supporting the pixels.

In addition, the sensor unit includes a first sensing element overlapping with the window portion, a second sensing element not overlapping with the window portion, and a sensing circuit which is electrically connected to the first sensing element and the second sensing element and does not overlap with the window portion.

The first sensing element includes an insulating layer, and a first electrode and a second electrode between which the insulating layer is interposed.

The second sensing element includes a photoelectric conversion element.

The sensing circuit is supplied with a selection signal and supplies a sensing signal on the basis of a change in the parasitic capacitance of the first sensing element or on the basis of the current flowing through the second sensing element.

Through the scan line, the selection signal can be supplied. Through the signal line, the sensing signal can be supplied.

One embodiment of the present invention is the above-described input/output device including a coloring layer between a sensor unit and a pixel.

The above input/output device of one embodiment of the present invention includes an input device including the plurality of sensor units provided with the window portions which transmit visible light, the display portion including the plurality of pixels overlapping with the window portions, and the coloring layer between the window portion and the pixel.

Thus, positional data of a sensor unit and a sensing signal sensed by the sensor unit can be supplied, image data can be displayed, and image data associated with the positional data of the sensor unit can be displayed. As a result, a novel input/output device that is highly convenient or reliable can be provided.

In a block diagram attached to this specification, components are classified according to their functions and shown as independent blocks; however, it is practically difficult to completely separate the components according to their functions, and one component may have a plurality of functions.

In this specification, the terms source and drain of a transistor interchange with each other depending on the polarity of the transistor or the levels of potentials applied to the terminals. In general, in an n-channel transistor, a terminal to which a lower potential is applied is called a source, and a terminal to which a higher potential is applied is called a drain. Furthermore, in a p-channel transistor, a terminal to which a lower potential is applied is called a drain, and a terminal to which a higher potential is applied is called a source. In this specification, although a connection relationship of a transistor is described assuming that the source and the drain are fixed in some cases for convenience, actually, the names of the source and the drain interchange with each other depending on the relation of the potentials.

In this specification, the term source of a transistor means a source region that is part of a semiconductor film functioning as an active layer or a source electrode connected to the semiconductor film. Similarly, the term drain of a transistor means a drain region that is part of the semiconductor film or a drain electrode connected to the semiconductor film. In addition, the term gate means a gate electrode.

In this specification, a state in which transistors are connected in series means, for example, a state in which only one of a source and a drain of a first transistor is connected to only one of a source and a drain of a second transistor. In addition, a state in which transistors are connected in parallel means a state in which one of a source and a drain of a first transistor is connected to one of a source and a drain of a second transistor and the other of the source and the drain of the first transistor is connected to the other of the source and the drain of the second transistor.

The term connection in this specification means electrical connection and corresponds to the case of a configuration in which current, voltage, or potential can be supplied or transmitted. Therefore, a circuit configuration in which connection is made does not necessarily refers to a state of direct connection, and also includes a circuit configuration in which connection is indirectly made through a circuit element such as a wiring, a resistor, a diode, or a transistor so that current, voltage and potential can be supplied or transmitted.

In this specification, even when different components are connected to each other in a circuit diagram, there is actually a case where one conductive film has functions of a plurality of components such as a case where part of a wiring serves as an electrode. The term connection in this specification also means such a case where one conductive film has functions of a plurality of components.

Furthermore, in this specification, one of a first electrode and a second electrode of a transistor refers to a source electrode and the other refers to a drain electrode.

According to one embodiment of the present invention, a novel input device that is highly convenient or reliable can be provided. A novel input/output device that is highly convenient or reliable can be provided. Alternatively, a novel sensor, a novel input device, a novel input/output device, or a novel semiconductor device can be provided. Note that the descriptions of these effects do not preclude the existence of other effects. One embodiment of the present invention does not necessarily have all the effects listed above. Other effects will be apparent from and can be derived from the description of the specification, the drawings, the claims, and the like.

BRIEF DESCRIPTION OF THE DRAWINGS

In the accompanying drawings:
FIGS. 3A to 3D2 are a block diagram, circuit diagrams, and timing charts illustrating a structure of an input device according to one embodiment;
FIGS. 4A to 4D2 are a block diagram, circuit diagrams, and timing charts illustrating a structure of an input device according to one embodiment;
FIGS. 8A1 to 8E2 are schematic views illustrating a manufacturing process of a stack according to one embodiment;
FIGS. 9A1 to 9E2 are schematic views illustrating a manufacturing process of a stack according to one embodiment;
FIGS. 10A1 to 10E2 are schematic views illustrating the manufacturing process of a stack according to one embodiment;
FIGS. 11A1 to 11D2 are schematic views illustrating a manufacturing process of a stack comprising an opening portion in a support according to one embodiment;
FIGS. 12A1 to 12B2 are schematic views illustrating structures of a processed member according to one embodiment.

DETAILED DESCRIPTION OF THE INVENTION

Figure 1A:
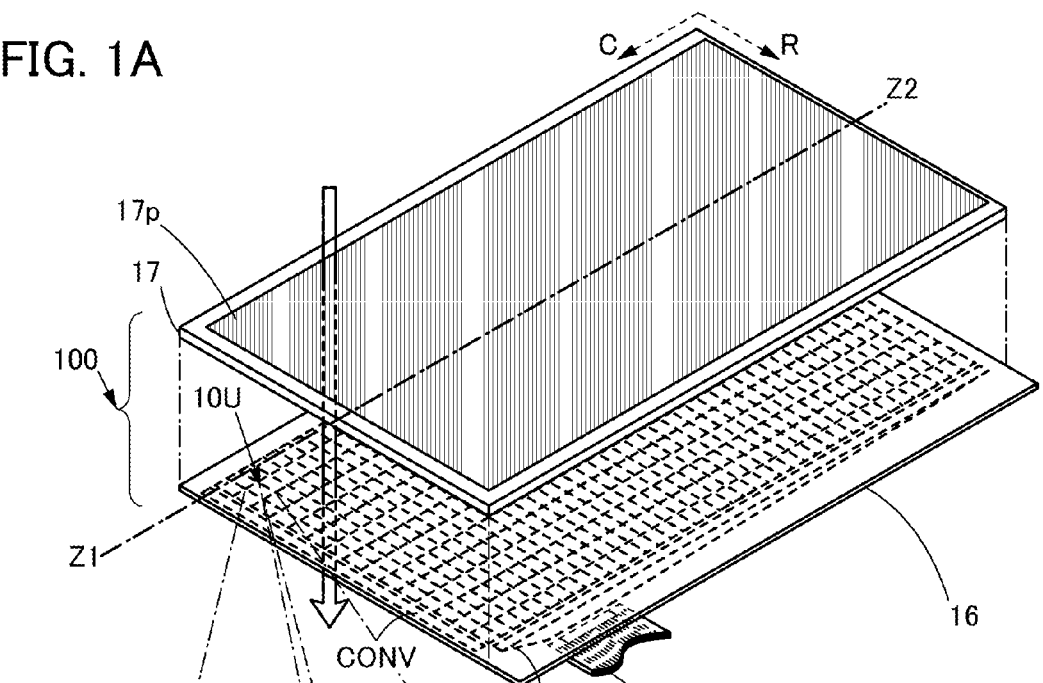
FIGS. 1A and 1B are projection views illustrating a structure of an input device according to one embodiment.

An input device of one embodiment of the present invention includes sensor units that are arranged in a matrix and each include a window portion which transmits visible light, a light-transmitting first sensing element which includes an insulating layer and a pair of electrodes between which the insulating layer is interposed and overlaps with the window portion, a second sensing element which includes a photoelectric conversion element and does not overlap with the window portion, and a sensing circuit which supplies a sensing signal on the basis of a change in the parasitic capacitance of the first sensing element or on the basis of the current flowing through the second sensing element; and a base layer supporting the sensor units.

Note that the parasitic capacitance of the first sensing element is changed when an object gets close to the first electrode or the second electrode or when the gap between the first electrode and the second electrode is changed, for example. The electromotive force of the second sensing element is changed when the intensity of received light is changed.

Thus, supply of positional data of a sensor unit and supply of the sensing signal from the sensor unit on the basis of a change in capacitance or in electromotive force can be achieved, and visible light can be transmitted. Consequently, a novel input device that is highly convenient or reliable can be provided.

Embodiments will be described in detail with reference to the drawings. Note that the present invention is not limited to the description below, and it is easily understood by those skilled in the art that modes and details disclosed herein can be modified in various ways without departing from the spirit and scope of the present invention. Therefore, the present invention is not construed as being limited to the description of the embodiments. Note that in the structures of the invention described below, the same portions or portions having similar functions are denoted by the same reference numerals in different drawings, and description of such portions is not repeated.

(Embodiment 1)

In this embodiment, a structure of an input device of one embodiment of the present invention is described with reference to FIGS. 1A and 1B and FIG. 2.

Figure 1B:
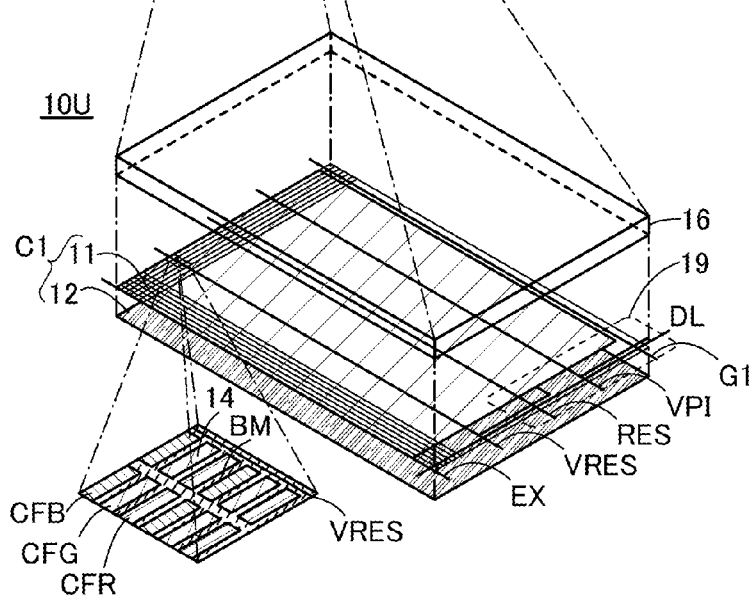

FIGS. 1A and 1B illustrate a structure of an input device 100 of one embodiment of the present invention. FIG. 2 is a cross-sectional view illustrating a structure of the input device 100 of one embodiment of the present invention.

FIG. 1A is a projection view of the input device 100 of one embodiment of the present invention. FIG. 1B is an enlarged projection view of a sensor unit 10U, which is part of FIG. 1A.

Figure 2:
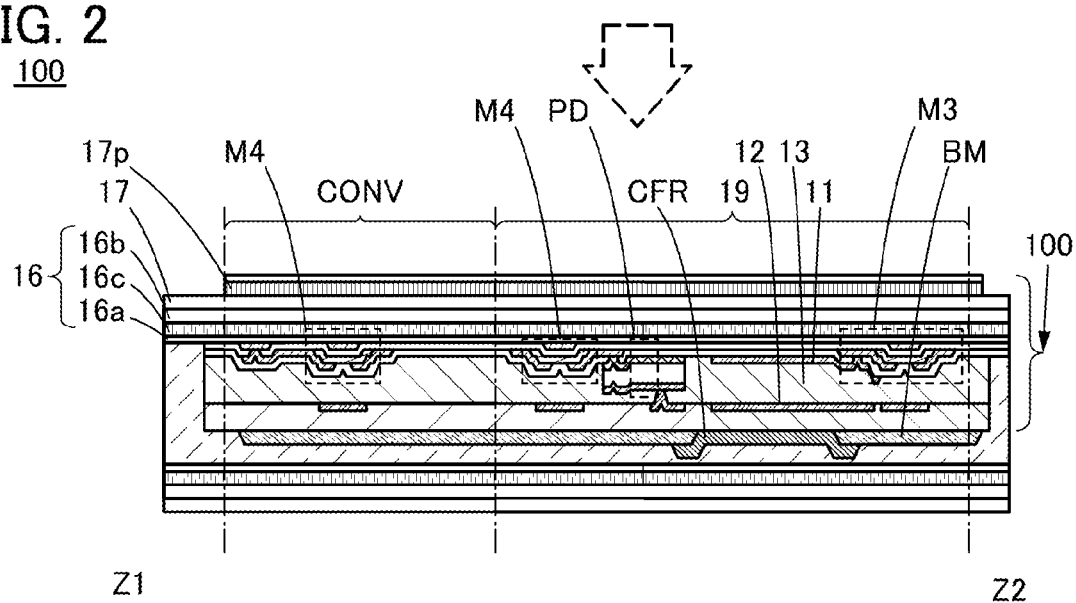
FIG. 2 is a cross-sectional view illustrating the structure of an input device according to one embodiment.

FIG. 2 is a cross-sectional view illustrating a cross-sectional structure of the input device 100 of one embodiment of the present invention along the line Z1-Z2 in FIG. 1A.

<Structure Example 1 of Input Device>

The input device 100 described in this embodiment includes a plurality of sensor units 10U arranged in a matrix, scan lines G1 which are placed along the row direction (indicated by the arrow R in the figure) and to which the plurality of sensor units are electrically connected, signal lines DL which are placed along the column direction (indicated by the arrow C in the figure) and to which the plurality of sensor units are electrically connected, and a base layer 16 provided with the sensor units 10U, the scan lines G1, and the signal lines DL (see FIG. 1B).

In addition, the sensor unit 10U includes window portions 14 which transmit visible light, a first sensing element C1 overlapping with the window portions 14, a second sensing element PD not overlapping with the window portion 14, and a sensing circuit 19 which is electrically connected to the first sensing element C1 and the second sensing element PD and does not overlap with the window portions 14 (see FIG. 1B, FIG. 2, and FIGS. 3A to 3D2).

The first sensing element C1 includes an insulating layer, and a first electrode 11 and a second electrode 12 between which the insulating layer 13 is interposed.

The second sensing element PD includes a photoelectric conversion element (see FIG. 2).

The sensing circuit 19 is supplied with a selection signal and supplies a sensing signal DATA on the basis of a change in the parasitic capacitance of the first sensing element C1 or on the basis of the current flowing through the second sensing element PD.

Through the scan line G1, the selection signal can be supplied.

Through the signal line DL, the sensing signal can be supplied.

The above input device 100 of one embodiment of the present invention includes the sensor units that are arranged in a matrix and each include the window portions 14 which transmit visible light, the light-transmitting first sensing element C1 which includes the insulating layer and the first electrode 11 and the second electrode 12 between which the insulating layer is interposed and overlaps with the window portions 14, the second sensing element PD which includes a photoelectric conversion element and does not overlap with the window portions 14, and the sensing circuit which supplies the sensing signal on the basis of a change in the capacitance of the first sensing element C1 or on the basis of the current flowing through the second sensing element PD; and the base layer supporting the sensor units.

The capacitance of the first sensing element C1 is changed when an object gets close to the first electrode 11 or the second electrode 12 or when the gap between the first electrode 11 and the second electrode 12 is changed, for example. The electromotive force of the second sensing element PD is changed when the intensity of received light is changed.

Thus, the sensor unit 10U can supply the sensing signal DATA so that the sensing signal DATA can be associated with the position of the sensor unit 10U, and the sensor unit 10U can transmit visible light. Consequently, a novel input device that is highly convenient or reliable can be provided.

Note that various gestures (e.g., tap, drag, swipe, and pinch in) can be made using a finger touching the input device 100 as a pointer. Data on the position, track, or the like of the finger touching the input device 100 are supplied to an arithmetic device. Then, if the arithmetic device determines that the data satisfy predetermined conditions, it can be recognized that a predetermined gesture has been given. Accordingly, an instruction associated with the predetermined gesture can be executed by the arithmetic device.

The input device 100 may include a driver circuit GD which can supply selection signals at predetermined timings. For example, the driver circuit GD supplies selection signals to the scan lines G1 in a predetermined order.

The input device 100 may include a converter CONV which converts the sensing signal DATA supplied from the sensor unit 10U. The converter CONV includes one or a plurality of converters CONV(1) to CONV(j) (j is a natural number greater than or equal to 1 and less than or equal to m). For example, the converter CONV(j) may convert the sensing signal DATA supplied through the signal line DL(j) and supply the converted signal.

The input device 100 may be electrically connected to a flexible printed substrate FPC1. For example, the flexible printed substrate FPC1 may supply various potentials such as a power supply potential, various timing signals, or the like and may be supplied with a signal based on the sensing signal DATA.

The input device 100 may include a base layer 17 and/or a protective layer 17p overlapping with the sensor unit 10U. The base layer 17 and/or the protective layer 17p can prevent the input device 100 from being scratched.

The input device 100 may include the window portions 14 which transmit visible light.

The input device 100 may include a wiring VPI, a wiring RES, the wiring VRES, and a wiring EX which do not overlap with the window portions 14.

The input device 100 may include, at a position overlapping with window portions 14, coloring layers transmitting light of a predetermined color, such as a coloring layer CFB transmitting blue light, a coloring layer CFG transmitting green light, or a coloring layer CFR transmitting red light.

In the input device 100, a light-blocking layer BM may be included so as to surround the window portions 14, i.e., so as not to overlap with the window portions 14.

Individual components forming the input device 100 are described below. Note that these components cannot be clearly distinguished and one component also serves as another component or includes part of another component in some cases.

<<Overall Structure>>

The input device 100 described in this embodiment includes the sensor units 10U, the scan lines G1, the signal lines DL, and the base layer 16.

<<Sensor Unit>>

The sensor unit 10U includes the window portions 14 which transmit visible light, the first sensing element C1, the second sensing element PD, and the sensing circuit 19.

<<Window Portions 14, Coloring Layer, and Light-Blocking Layer BM>>

The window portions 14 transmit visible light.

For example, the base layer 16, the first electrode 11, an insulating layer 13 having flexibility, the base layer 17, and the second electrode 12 overlap with each other so as not to prevent transmission of visible light, thereby forming the window portions 14. For example, a material that transmits visible light or a material that is thin enough to transmit visible light can be used for the base layer 16, the first electrode 11, the insulating layer 13 having flexibility, the base layer 17, and the second electrode 12.

For example, a material that does not transmit visible light may be used and an opening portion may be provided in the material, specifically, one or more opening portions having various shapes such as a rectangle may be provided.

Coloring layers transmitting light of predetermined colors are provided to overlap with windows portions 14. For example, the coloring layer CFB transmitting blue light, the coloring layer CFG, or the coloring layer CFR are provided (see FIG. 1B).

Note that, in addition to the coloring layers transmitting blue light, green light, and/or red light, coloring layers transmitting light of various colors such as a coloring layer transmitting white light and a coloring layer transmitting yellow light can be provided.

For the coloring layers, metal materials, pigment, dyes, or the likes can be used.

The light-blocking layer BM can be placed so as to surround the window portions 14. The light-blocking layer BM does not easily transmit light as compared to the window portions 14.

For the light-blocking layer BM, carbon black, a metal oxide, a composite oxide containing a solid solution of a plurality of metal oxides, or the like can be used.

The scan line G1, the signal line DL, the wiring VPI, the wiring RES, the wiring VRES, and the sensing circuit 19 can be provided to overlap with the light-blocking layer BM.

Note that a light-transmitting overcoat layer covering the coloring layers and the light-blocking layer BM can be provided.

<<First Sensing Element C1>>

The first sensing element C1 includes the insulating layer 13, and the first electrode 11 and the second electrode 12 between which the insulating layer 13 is interposed (see FIG. 1B and FIG. 2).

The first electrode 11 is formed into, for example, an island shape so as to be apart from the first electrode 11 of an adjacent sensor unit.

In particular, a layer that can be formed in the same process as the first electrode 11 is preferably placed in the proximity of the first electrode 11 so that a user of the input device 100 does not discern the first electrode 11 is provided. Further preferably, the number of the window portions 14 placed in a gap between the first electrode 11 and the layer placed in the proximity of the first electrode 11 is as small as possible. In particular, the window portions 14 are preferably not placed in the gap.

The second electrode 12 is provided to overlap with the first electrode 11, and the insulating layer 13 is provided between the first electrode 11 and the second electrode 12.

For example, when an object whose dielectric constant is different from that of the air gets close to the first electrode 11 or the second electrode 12 of the first sensing element C1 put in the air, the capacitance of the first sensing element C1 changes. Specifically, when an object such as a finger gets close to the first sensing element C1, the capacitance of the first sensing element C1 changes. Thus, the first sensing element C1 can be used as a proximity sensor.

For example, the capacitance of the first sensing element C1 which can change its form varies with the change in the form of the first sensing element C1.

Specifically, when an object such as a finger touches the first sensing element C1 and a gap between the first electrode 11 and the second electrode 12 becomes small, the capacitance of the first sensing element C1 increases. Thus, the first sensing element C1 can be used as a contact sensor.

Specifically, when the first sensing element C1 is folded, the gap between the first electrode 11 and the second electrode 12 becomes small. Accordingly, the capacitance of the first sensing element C1 increases. Thus, the first sensing element C1 can be used in a folding sensor.

The first electrode 11 and the second electrode 12 include a conductive material.

For example, an inorganic conductive material, an organic conductive material, metal, conductive ceramic, or the like can be used for the first electrode 11 and the second electrode 12.

Specifically, a metal element selected from aluminum, chromium, copper, tantalum, titanium, molybdenum, tungsten, nickel, silver, and manganese, an alloy including the above-described metal element, an alloy including any of the above-described metal elements in combination, or the like can be used.

Alternatively, a conductive oxide such as indium oxide, indium tin oxide, indium zinc oxide, zinc oxide, or zinc oxide to which gallium is added can be used.

Alternatively, graphene or graphite can be used.

A film containing graphene can be formed, for example, by reducing graphene oxide in a film containing graphene oxide. As a reducing method, a method with application of heat, a method using a reducing agent, and the like can be given.

Alternatively, a conductive high molecular weight material can be used.

<<Second Sensing Element PD>>

The second sensing element PD includes a photoelectric conversion element (see FIG. 2). The second sensing element PD generates electromotive force when light is received as indicated by the arrow.

As the second sensing element PD, for example, a photodiode can be used. Specifically, silicon can be used for a semiconductor layer. In particular, a photodiode in which p-type amorphous silicon, i-type amorphous silicon, and n-type amorphous silicon are stacked can be used favorably.

<<Sensing Circuit 19, Scan Line G1, and Signal Line DL>>

The sensing circuit 19 includes, for example, transistors and wirings through which a power supply potential and a signal are supplied, such as the signal line DL, the wiring VPI, a wiring CS, the scan line G1, the wiring RES, the wiring VRES, and the signal line DL. Note that a specific structure of the sensing circuit 19 is described in detail in Embodiment 2.

Note that the sensing circuit 19 may be placed in a region not overlapping with the window portions 14. For example, the wirings are placed in a region not overlapping with the window portions 14, so that an object on one side of the sensor unit 10U can be easily viewed from the other side.

For example, transistors that can be formed in a same process can be used in the sensing circuit 19 and a converter circuit included in the converter CONV.

For example, a group 4 element, a compound semiconductor, or an oxide semiconductor can be used for a semiconductor layer of the transistor included in the sensing circuit 19 or the converter CONV. Specifically, a semiconductor containing silicon, a semiconductor containing gallium arsenide, an oxide semiconductor containing indium, or the like can be used.

Note that a structure of a transistor in which an oxide semiconductor is used for the semiconductor layer is described in detail in Embodiment 5.

Through the scan line G1, the selection signal can be supplied.

Through the signal line DL, the sensing signal can be supplied.

Through the wiring VRES, a predetermined potential can be supplied. For example, a potential at which a transistor included in the sensing circuit 19 is turned on can be supplied to a gate of the transistor.

Through the wiring RES, a reset signal can be supplied.

Through the wiring EX, a light exposure control signal can be supplied.

Through the wiring VPI, a predetermined potential can be supplied. For example, a ground potential or a power supply potential can be supplied.

Through the wiring CS, a control signal which controls the potential of the second electrode 12 of the first sensing element C1 can be supplied.

For the wirings, a conductive material can be used.

For example, an inorganic conductive material, an organic conductive material, metal, conductive ceramic, or the like can be used for the wiring. Specifically, a material which is the same as those of the first electrode 11 and the second electrode 12 can be used.

For the scan line G1, the signal line DL, the wiring VPI, the wiring RES, and the wiring VRES, a metal material such as aluminum, gold, platinum, silver, nickel, titanium, tungsten, chromium, molybdenum, iron, cobalt, copper, or palladium, or an alloy material containing the metal material can be used.

Note that the base layer 16 may be provided with the sensing circuit 19 by processing a film formed on the base layer 16.

Alternatively, the sensing circuit 19 formed on another base layer may be transferred to the base layer 16. An example of a method of manufacturing the sensing circuit 19 is described in detail in Embodiments 6 to 8.

<<Base Layer 16>>

For the flexible base layer 16, an organic material, an inorganic material, or a composite material of an organic material and an inorganic material can be used.

For the base layer 16, a material with a thickness greater than or equal to 5 µm and less than or equal to 2500 µm, preferably or less 5 µm and less than or equal to 680 µm, further preferably greater than or equal to 5 µm and less than or equal to 170 µm, further preferably greater than or equal to 5 µm and less than or equal to 45 µm, further preferably greater than or equal to 8 µm and less than or equal to 25 µm can be used.

A material with which passage of impurities is inhibited can be preferably used for the base layer 16. For example, a material with a vapor permeability less than or equal to $10^{-5}$ g/(m$^2$·day), preferably less than or equal to $10^{-6}$ g/(m$^2$·day) can be favorably used.

Preferably, a combination of materials having substantially equal coefficients of linear expansion can be used for the base layer 16. For example, the coefficients of linear expansion of the materials are preferably less than or equal to $1 \times 10^{-3}$/K, further preferably less than or equal to $5 \times 10^{-5}$/K, and still further preferably less than or equal to $1 \times 10^{-5}$/K.

For example, an organic material such as a resin, a resin film, or a plastic film can be used as the base layer 16.

For example, an inorganic material such as a metal plate or a thin glass plate with a thickness greater than or equal to 10 µm and less than or equal to 50 µm can be used as the base layer 16.

For example, a composite material such as a resin film to which a metal plate, a thin glass plate, or a film of an inorganic material is attached with the use of a resin layer can be used as the base layer 16.

For example, a composite material formed by dispersing a fibrous or particulate metal, glass, or inorganic material into a resin or a resin film can be used as the base layer 16.

For example, as the resin layer, a thermosetting resin or an ultraviolet curable resin can be used.

Specifically, a resin film or a resin plate of polyester, polyolefin, polyamide, polyimide, polycarbonate, an acrylic resin, or the like can be used.

Specifically, non-alkali glass, soda-lime glass, potash glass, crystal glass, or the like can be used.

Specifically, a metal oxide film, a metal nitride film, a metal oxynitride film, or the like can be used. For example, silicon oxide, silicon nitride, silicon oxynitride, an alumina film, or the like can be used.

Specifically, SUS, aluminum, or the like in which an opening portion is provided can be used.

Specifically, an acrylic resin, a urethane resin, an epoxy resin, or a resin having a siloxane bond can be used.

For example, a stack in which a flexible base layer 16b, a barrier film 16a which prevents diffusion of impurities, and a resin layer 16c attaching the barrier film 16a to the base layer 16b are stacked can be preferably used for the base layer 16 (see FIG. 2).

Specifically, a film containing a stacked-layer material of a 600-nm-thick silicon oxynitride film and a 200-nm-thick silicon nitride film can be used as the barrier film 16a.

Specifically, a film including a stacked-layer material of a 600-nm-thick silicon oxynitride film, a 200-nm-thick silicon nitride film, a 200-nm-thick silicon oxynitride film, a 140-nm-thick silicon nitride oxide film, and a 100-nm-thick silicon oxynitride film stacked in this order can be used as the barrier film 16a.

A resin film or a resin plate of polyester, polyolefin, polyamide, polyimide, polycarbonate, an acrylic resin, or the like can be used as the base layer 16b.

For example, materials that include polyester, polyolefin, polyamide (e.g., nylon or aramid), polyimide, polycarbonate, or a resin having an acrylic bond, a urethane bond, an epoxy bond, or a siloxane bond can be used for the resin layer 16c.

This embodiment can be combined with any of the other embodiments described in this specification as appropriate.

(Embodiment 2)

In this embodiment, a structure of an input device of one embodiment of the present invention is described with reference to FIGS. 3A to 3D2.

FIGS. 3A to 3D2 illustrate a structure of the input device 100 of one embodiment of the present invention.

FIG. 3A is a block diagram illustrating a configuration of the input device 100 of one embodiment of the present invention. FIG. 3B is a circuit diagram illustrating a configuration of the converter CONV which can be used in the input device 100 in FIG. 3A. FIG. 3C is a circuit diagram illustrating a configuration of the sensing circuit 19 which can be used in the input device 100 in FIG. 3A.

FIGS. 3D1 and 3D2 are timing charts each illustrating a driving method of the sensor unit 10U which can be used in the input device 100 of one embodiment of the present invention.

<Structure Example 1 of Input Device>

The input device 100 described in this embodiment includes a plurality of sensor units 10U arranged in a matrix, the scan lines G1 which are placed along the row direction and to which the plurality of sensor units 10U are electrically connected, the signal lines DL which are placed along the column direction and to which the plurality of sensor units 10U are electrically connected, and the base layer 16 provided with the sensor units 10U, the scan lines G1, and the signal lines DL (see FIG. 3A).

For example, the plurality of sensor units 10U can be arranged in a matrix of n rows and m columns (n and m are natural numbers greater than or equal to 1).

The sensor unit 10U includes the first sensing element C1 and the second sensing element PD. The first electrode 11 of the first sensing element C1 and a first electrode of the second sensing element PD are electrically connected to a gate of a first transistor M1.

The second electrode 12 of the first sensing element C1 is electrically connected to the wiring CS. Hence, the potential of the second electrode 12 of the first sensing element C1 can be controlled using the control signal supplied through the wiring CS, a power supply potential, or a ground potential.

Note that the structure described in Embodiment 1 can be applied to the input device 100 described in this embodiment.

<<Sensing Circuit 19>>

The sensing circuit 19 of one embodiment of the present invention includes the first transistor M1, a first switch, a second switch, a third switch, and the second sensing element PD.

In the first transistor M1, the gate is electrically connected to the first electrode 11 of the first sensing element C1, and a first electrode of the first transistor M1 is electrically connected to the wiring VPI through which a ground potential can be supplied.

As the first switch, a second transistor M2 can be used. For example, the second transistor M2 comprising a gate electrically connected to the scan line G1 through which the selection signal can be supplied, a first electrode electrically connected to a second electrode of the first transistor M1, and a second electrode electrically connected to the signal line DL through which the sensing signal can be supplied can be used as the first switch.

As the second switch, a third transistor M3 can be used. For example, the third transistor M3 comprising a gate electrically connected to the wiring RES through which the reset signal can be supplied, a first electrode electrically connected to the first electrode of the first sensing element C1, and a second electrode electrically connected to the wiring VRES through which a potential at which the first transistor M1 is turned on can be supplied can be used as the second switch.

As the third switch, a fourth transistor M4 can be used. For example, the fourth transistor M4 comprising a gate electrically connected to the wiring EX through which the light exposure control signal can be supplied and a first electrode electrically connected to the first electrode of the first sensing element C1 can be used as the third switch.

As the second sensing element PD, a photoelectric conversion element can be used. For example, a photoelectric conversion element comprising a first electrode electrically connected to a second electrode of the fourth transistor M4 and comprising a second electrode electrically connected to the wiring VPI through which a ground potential can be supplied can be used as the second sensing element PD.

The above input device 100 of one embodiment of the present invention includes the plurality of sensor units 10U including the first sensing element C1, the second sensing element PD, and the sensing circuit 19. Each sensing circuit 19 includes the first transistor M1 comprising a gate electrically connected to the first electrode 11 of the first sensing element C1, and to the first electrode of the second sensing element PD via the third switch.

Thus, through the first transistor, the sensing signal supplied from a sensor unit on the basis of a change in capacitance or a change in electromotive force can be supplied to one signal line. As a result, positional data of the sensor unit and the sensing signal from the sensor unit can be supplied, and visible light can be transmitted. Consequently, a novel input device that is highly convenient or reliable can be provided.

The input device 100 may include the wiring VPI, the wiring RES, the wiring VRES, and the wiring EX which do not overlap with the window portion.

The input device 100 may include a converter CONV which converts the sensing signal DATA supplied from the sensor unit 10U. The converter CONV includes one or a plurality of converters CONV(1) to CONV(j) (j is a natural number greater than or equal to 1 and less than or equal to m). For example, the converter CONV(j) may convert the sensing signal DATA supplied through the signal line DL(j) and supply the converted signal. Note that the first sensing element C1 or the second sensing element PD supplies the sensing signal DATA to the signal line DL(j) through the sensing circuit 19. In addition, the converter CONV(j) can convert the sensing signal DATA supplied from any sensing element connected to the signal line DL(j). Therefore the converter CONV(j) is not necessarily provided for each sensing element, and the configuration of the input device can be simplified accordingly.

Individual components forming the input device 100 are described below. Note that these components cannot be clearly distinguished and one component also serves as another component or includes part of another component in some cases.

<<Converter CONV>>

The converter CONV includes a converter circuit. The converter circuit includes transistors and wirings through which a power supply potential and a signal are supplied, such as a wiring VPO and a wiring BR. For example, a potential that is high enough to drive the transistors included in the converter circuit and the sensing circuit can be supplied.

As the converter CONV, any of various circuits that can convert the sensor signal DATA and supply the converted signal to a terminal OUT can be used. For example, a source follower circuit, a current mirror circuit, or the like may be formed by the electrical connection between the converter CONV and the sensing circuit 19.

Specifically, by using the converter CONV using a sixth transistor M6, the source follower circuit can be formed (see FIG. 3B). Note that a transistor that can be formed in the same process as the first transistor M1 to the third transistor M3 may be used as the transistor M4.

The first transistor M1 to the sixth transistor M6 each include a semiconductor layer. For example, for the semiconductor layer, a group 4 element, a compound semiconductor, or an oxide semiconductor can be used. Specifically, a semiconductor containing silicon, a semiconductor containing gallium arsenide, an oxide semiconductor containing indium, or the like can be used.

A structure of a transistor in which an oxide semiconductor is used for a semiconductor layer is described in detail in Embodiment 5.

<Driving Method 1 of Sensing Circuit 19>

A driving method 1 of the sensing circuit 19 which can supply the sensing signal DATA on the basis of a change in the parasitic capacitance of the first sensing element C1 is described. Note that the driving method 1 can be referred to as a capacitance sensing mode.

<<First Step>>

In a first step, the reset signal that turns on the third transistor M3 and then turns it off is supplied, so that the potential of the gate of the first transistor M1 is set to a predetermined potential (see a period T1 in FIG. 3D1).

Specifically, the wiring RES is made to supply the reset signal. The third transistor M3 to which the reset signal is supplied can set the potential of a node A to, for example, a potential at which the first transistor M1 can be turned on.

In synchronization with the reset signal, the light exposure control signal that turns on the fourth transistor M4 and then turns it off may be supplied to the gate of the fourth transistor M4, so that the potential of the first electrode of the second sensing element PD may be set to a predetermined potential.

Specifically, the wiring EX is made to supply the light exposure control signal. The fourth transistor M4 to which the light exposure control signal is supplied sets the potential of the first electrode (indicated by B in the figure) of the second sensing element PD to a potential lower than the potential of the gate of the first transistor M1 by a threshold voltage of the fourth transistor M4.

Note that the first step can be carried out in all the sensor units 10U at the same time.

<<Second Step>>

In a second step, the light exposure control signal that turns off the fourth transistor M4 is supplied to the gate.

Specifically, the wiring EX is made to supply the light exposure control signal. For example, the potential of the gate of the fourth transistor M4 to which the light exposure control signal is supplied is set to a ground potential.

<<Third Step>>

In a third step, a selection signal that turns on the second transistor M2 is supplied to the gate, and the second electrode of the first transistor M1 is electrically connected to the signal line DL.

Specifically, the scan line G1 is made to supply the selection signal. The second transistor M2 to which the selection signal is supplied is turned on, and the second electrode of the first transistor M1 is electrically connected to the signal line DL (see a period T2 in FIG. 3D1).

<<Fourth Step>>

In a fourth step, the control signal is supplied to the second electrode 12 of the first sensing element C1, and the control signal and a potential that varies depending on the capacitance of the first sensing element C1 are supplied to the gate of the first transistor M1.

Specifically, the wiring CS is made to supply a rectangular wave control signal (see the latter half in the period T2 in FIG. 3D1). The first sensing element C1 whose second electrode 12 is supplied with the rectangular wave control signal increases the potential of the node A on the basis of the capacitance of the first sensing element C1.

For example, in the case where the first sensing element C1 is put in the air, when an object whose dielectric constant is higher than that of the air is placed in the proximity of the second electrode 12 of the first sensing element C1, the apparent capacitance of the first sensing element C1 is increased.

Thus, a change in the potential of the node A due to the rectangular wave control signal is smaller when an object having a higher dielectric constant than the air is placed in the proximity than that when such an object is not placed in the proximity (see a dotted line in FIG. 3D1).

<<Fifth Step>>

In a fifth step, the sensing signal DATA caused by a change in the potential of the gate of the first transistor M1 is supplied to the signal line DL.

For example, the current flowing through the first transistor M1, which changes depending on a change in the potential of the gate of the first transistor M1, is supplied to the signal line DL.

The converter CONV converts a change in the current flowing through the signal line DL into a change in voltage and outputs the voltage to the terminal OUT.

<<Sixth Step>>

In a sixth step, the selection signal that turns off the second transistor M2 is supplied to the gate.

Specifically, the potential of the gate of the second transistor M2 is set to a ground potential (see a period T3 in FIG. 3D1).

The scan lines G1(1) to G1(n) are sequentially selected. When the scan line G1(1) is selected, the first to fifth steps described above are performed. When the scan lines G1(2) to G1(n) are selected, the second to fifth steps are repeated for each scan line.

<Driving Method 2 of Sensing Circuit 19>

A driving method 2 of the sensing circuit 19 which can supply the sensing signal DATA on the basis of a change in the electromotive force of the second sensing element PD is described. Note that the driving method 2 can be referred to as a light sensing mode.

This method is different from the above-described driving method 1 of the sensing circuit 19 in that the light exposure control signal is supplied to the gate of the fourth transistor M4 in synchronization with the reset signal in a first step and in that the light exposure control signal that turns on the fourth transistor M4 for a predetermined period is supplied to the gate in a fourth step. Such different steps are described in detail below. Refer to the above-described description for the part where the same steps can be employed.

<<First Step>>

The first step is different from the above first step in that the light exposure control signal that turns on the fourth transistor M4 and then turns it off is supplied to the gate in synchronization with the reset signal, and the potential of the first electrode (indicated by B in the figure) of the second sensing element PD is set to a predetermined potential (see a period T1 in FIG. 3D2).

Specifically, the wiring EX is made to supply the light exposure control signal. The fourth transistor M4 to which the light exposure control signal is supplied sets the potential of the first electrode of the second sensing element to a potential lower than the potential of the gate of the first transistor M1 by a threshold voltage of the fourth transistor M4.

<<Fourth Step>>

In the fourth step, the light exposure control signal that turns on the fourth transistor M4 for a predetermined period is supplied to the gate.

Specifically, the wiring EX is made to supply a rectangular wave light exposure control signal so that the potential of the gate of the fourth transistor M4 is set to a potential sufficiently higher than the threshold potential of the transistor M4 for a predetermined period.

The electromotive force of the second sensing element PD changes in accordance with the intensity of light received by the second sensing element PD. The current flowing through the second sensing element PD changes depending on the electromotive force of the second sensing element PD.

For example, when the second sensing element PD is put in a bright environment and an object blocking light received by the second sensing element PD is placed in the proximity of the second sensing element PD, the intensity of the received light decreases and the electromotive force is reduced.

Specifically, the received light is blocked by the approach of a finger or the like to the second sensing element PD, and the electromotive force is reduced.

Thus, a reduction in the potential of the node A due to light received by the second sensing element PD is smaller when an object blocking light is placed in the proximity than that when an object blocking light is not placed in the proximity (see a dotted line in the period T2 in FIG. 3D2).

By the driving method 2 (light sensing mode), positional data can be supplied using the input device 100 even when sensing with the first sensing element C1 is difficult.

For example, when an object that causes a small change in dielectric constant is placed in the proximity of the input device 100, positional data can be supplied. Alternatively, even when a drop of water or the like adheres to the input device 100, positional data can be favorably supplied.

This embodiment can be combined with any of the other embodiments described in this specification as appropriate.

(Embodiment 3)

In this embodiment, a structure of an input device of one embodiment of the present invention is described with reference to FIGS. 4A to 4D2.

FIGS. 4A to 4D2 illustrate a structure of the input device 100B of one embodiment of the present invention.

FIG. 4A is a block diagram illustrating a configuration of the input device 100B of one embodiment of the present invention. FIG. 4B is a circuit diagram illustrating a configuration of the converter CONV which can be used in the input device 100B in FIG. 3A. FIG. 4C is a circuit diagram illustrating a configuration of the sensing circuit 19B which can be used in the input device 100B in FIG. 4A.

FIGS. 4D1 and 4D2 are timing charts each illustrating a driving method of the sensor units 10UB which can be used in the input device 100B of one embodiment of the present invention.

<Structure Example 1 of Input Device>

The input device 100B described in this embodiment includes a plurality of sensor units 10UB arranged in a matrix, the scan lines G1 which are placed along the row direction and to which the plurality of sensor units 10UB are electrically connected, the scan lines DL which are placed along the column direction and to which the plurality of sensor units 10UB are electrically connected, and the base layer 16 provided with the sensor units 10UB, the scan lines G1, and the signal lines DL (see FIG. 4A).

For example, the plurality of sensor units 10UB can be arranged in a matrix of n rows and m columns (n and m are natural numbers greater than or equal to 1).

The sensor unit 10UB includes the first sensing element C1 and the second sensing element PD. The first electrode 11 of the first sensing element C1 and the first electrode of the second sensing element PD are electrically connected to the gate of the first transistor M1.

The second electrode 12 of the first sensing element C1 is electrically connected to the wiring CS. Hence, the potential of the second electrode 12 of the first sensing element C1 can be controlled using the control signal through which the wiring CS is supplied, a power supply potential, or a ground potential.

Note that the structure described in Embodiment 1 can be applied to the input device 100B described in this embodiment.

<<Sensing Circuit 19B>>

A structure of the sensing circuit 19B of one embodiment of the present invention may include the first transistor M1 comprising a first electrode electrically connected to the wiring VPI through which a ground potential can be supplied.

As the first switch, the second transistor M2 may be used. The structure may include the second transistor M2 comprising a gate electrically connected to the scan line G1 through which the selection signal can be supplied, a first electrode electrically connected to a second electrode of the first transistor M1, and a second electrode electrically connected to the signal line DL through which the sensing signal can be supplied.

As the second switch, the third transistor M3 may be used. The structure may include the third transistor M3 comprising a gate electrically connected to the wiring RES through which the reset signal can be supplied, a first electrode electrically connected to the gate of the first transistor M1, and a second electrode electrically connected to the wiring VRES through which a potential at which the first transistor M1 is turned on can be supplied.

As the third switch, the fourth transistor M4 may be used. The structure may include the fourth transistor M4 comprising a gate electrically connected to the wiring EX through which the light exposure control signal can be supplied and a first electrode electrically connected to the gate of the first transistor M1.

As the fourth switch, a fifth transistor M5 may be used. The structure may include the fifth transistor M5 comprising a gate electrically connected to a wiring PCL through which a mode switching signal can be supplied and a first electrode electrically connected to the gate of the first transistor M1.

The structure may include the first sensing element comprising a first electrode electrically connected to the second electrode of the third transistor M3 and a second electrode electrically connected to the wiring CS through which a ground potential can be supplied.

The structure may include the second sensing element PD comprising a first electrode electrically connected to a second electrode of the fourth transistor M4 and a second electrode electrically connected to the wiring VPI through which a ground potential can be supplied.

The structure may include a capacitor C2 comprising a first electrode electrically connected to a second electrode of the fourth transistor M4 and a second electrode electrically connected to the wiring CS through which a ground potential can be supplied.

The above input device of one embodiment of the present invention includes the plurality of sensor units 10UB including the first sensing element C1, the second sensing element PD, and the sensing circuit 19B. Each sensing circuit 19B includes the first transistor M1 comprising a gate electrically connected to the first electrode 11 of the first sensing element C1, and to the first electrode of the second sensing element PD via the third switch.

Thus, through the first transistor, the sensing signal based on a change in capacitance or a change in electromotive force can be supplied to one signal line. As a result, positional data of a sensor unit and the sensing signal from the sensor unit can be supplied, and visible light can be transmitted. Consequently, a novel input device that is highly convenient or reliable can be provided.

The input device 100 may include the wiring VPI, the wiring RES, the wiring VRES, and the wiring EX which do not overlap with the window portion.

The input device 100 may include a converter CONV which converts the sensing signal DATA supplied from the sensor unit 10U. The converter CONV includes one or a plurality of converters CONV(1) to CONV(j) (j is a natural number greater than or equal to 1 and less than or equal to m). For example, the converter CONV(j) may convert the sensing signal DATA supplied through the signal line DL(j) and supply the converted signal.

Individual components forming the input device 100 are described below. Note that these components cannot be clearly distinguished and one component also serves as another component or includes part of another component in some cases.

<<Converter CONV>>

The converter CONV includes a converter circuit. The converter circuit includes transistors and wirings through which a power supply potential and a signal are supplied, such as the wiring VPO and the wiring BR. For example, a potential that is high enough to drive the transistors included in the converter circuit and the sensing circuit can be supplied.

As the converter CONV, any of various circuits that can convert the sensor signal DATA and supply the converted signal to the terminal OUT can be used. For example, a source follower circuit, a current mirror circuit, or the like may be formed by the electrical connection between the converter CONV and the sensing circuit 19.

Specifically, by using the converter CONV using the sixth transistor M6, the source follower circuit can be formed (see FIG. 4B). Note that a transistor that can be formed in the same process as those of the first transistor M1 to the third transistor M3 may be used as the sixth transistor M6.

The first transistor M1 to the sixth transistor M6 each include a semiconductor layer. For example, for the semiconductor layer, a group 4 element, a compound semiconductor, or an oxide semiconductor can be used. Specifically, a semiconductor containing silicon, a semiconductor containing gallium arsenide, an oxide semiconductor containing indium, or the like can be used.

A structure of a transistor in which an oxide semiconductor is used for a semiconductor layer is described in detail in Embodiment 5.

<Driving Method 1 of Sensing Circuit 19B>

A driving method 1 of the sensing circuit 19B which can supply the sensing signal DATA on the basis of a change in the parasitic capacitance of the first sensing element C1 is described. Note that the driving method 1 can be referred to as a capacitance sensing mode.

This method is different from the driving method 1 of the sensing circuit 19 described in Embodiment 2 in that the mode switching signal that turns on the fifth transistor M5 is supplied to the gate in first to sixth steps. Such different steps are described in detail below. Refer to the above-described description for the part where the same steps can be employed.

<<First to Sixth Steps>>

In the first to sixth steps, the mode switching signal that turns on the fifth transistor M5 is supplied to the gate.

Specifically, the wiring PCL is made to supply the mode switching signal.

The fifth transistor M5 to which the mode switching signal is supplied sets the potential of the first electrode 11 of the first sensing element C1 to a potential lower than the potential of the gate of the first transistor M1 by a threshold voltage of the fifth transistor M5 (see periods T1 to T3 in FIG. 4D1).

<Driving Method 2 of Sensing Circuit 19B>

A driving method 2 of the sensing circuit 19B which can supply the sensing signal DATA on the basis of a change in the electromotive force of the second sensing element PD is described. Note that the driving method 2 can be referred to as a light sensing mode.

This method is different from the above-described driving method 2 of the sensing circuit 19 described in Embodiment 2 in that the mode switching signal that turns on the fifth transistor M5 is supplied to the gate in a first step and in that the mode switching signal that turns off the fifth transistor M5 is supplied to the gate in second to sixth steps. Such different steps are described in detail below. Refer to the above-described description for the part where the same steps can be employed.

<<First Step>>

In the first step, the mode switching signal that turns on the fifth transistor M5 is supplied to the gate.

Specifically, the wiring PCL is made to supply the mode switching signal. The fifth transistor M5 to which the mode switching signal is supplied sets the potential of the first electrode 11 of the first sensing element C1 to a potential lower than the potential of the gate of the first transistor M1 by a threshold voltage of the fifth transistor M5 (see a period T1 in FIG. 4D2).

<<Second to Sixth Steps>>

In the second to sixth steps, the mode switching signal that turns off the fifth transistor M5 is supplied to the gate.

Specifically, the wiring PCL is made to supply the mode switching signal. By turning off the fifth transistor M5, an object sensed by the first sensing element C1 has a reduced effect on the potential of the gate of the first transistor M1. Accordingly, the sensing signal due to an object sensed by the second sensing element PD can stand out (see periods T2 and T3 in FIG. 4D2).

This embodiment can be combined with any of the other embodiments described in this specification as appropriate.

(Embodiment 4)

In this embodiment, a structure of an input/output device of one embodiment of the present invention is described with reference to FIGS. 5A and 5B and FIGS. 6A to 6C.

Figure 5A:
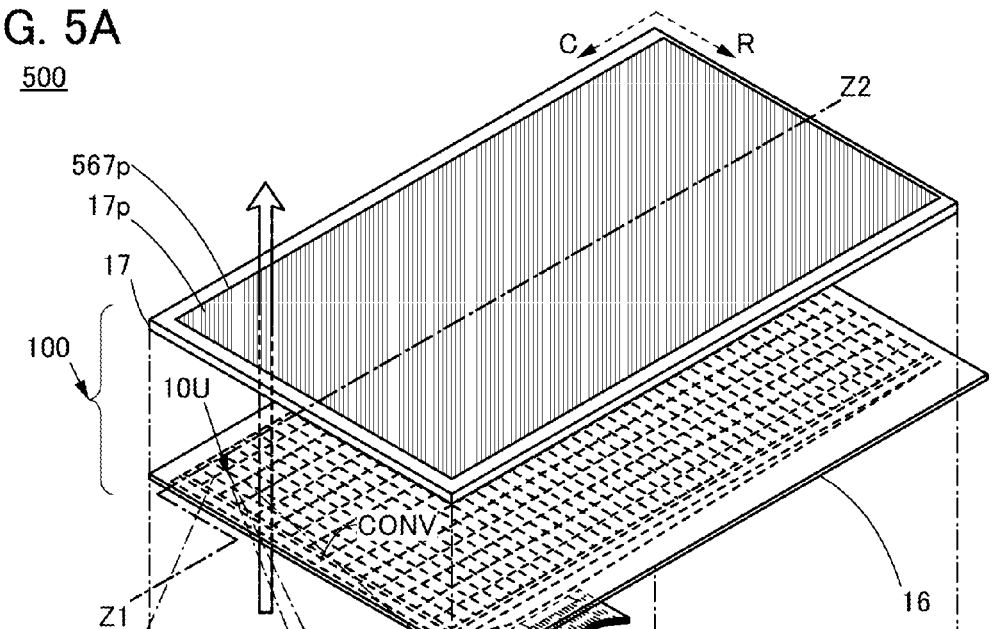
FIGS. 5A and 5B are projection views illustrating a structure of an input/output device according to one embodiment.
Figure 5B:
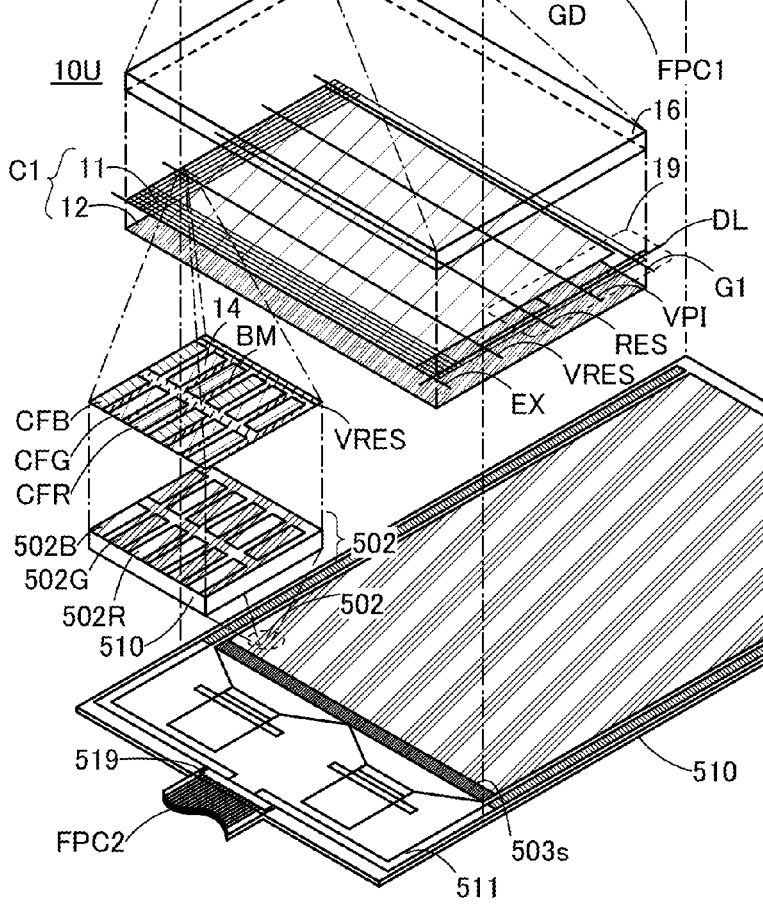
Figure 6A:
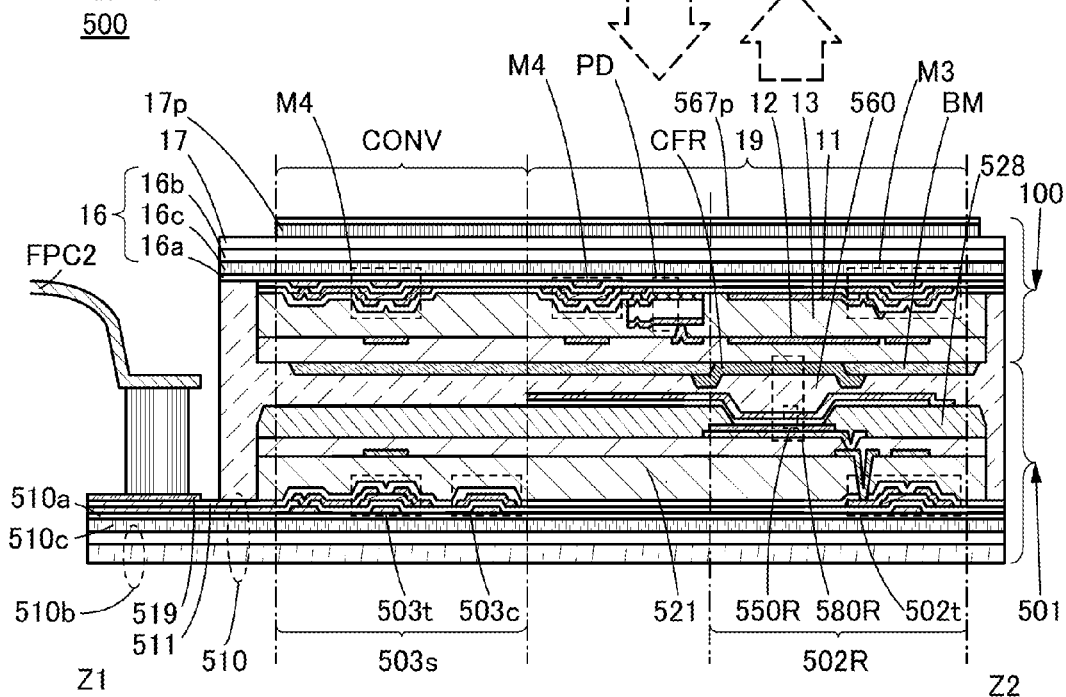
FIGS. 6A to 6C are cross-sectional views illustrating the structure of an input/output device according to one embodiment.
Figure 6B:
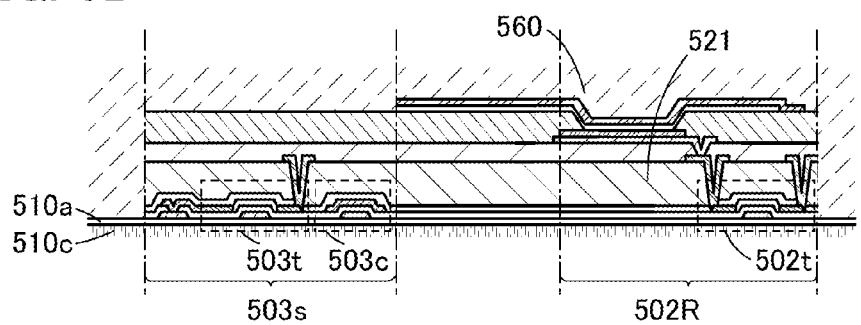
Figure 6C:
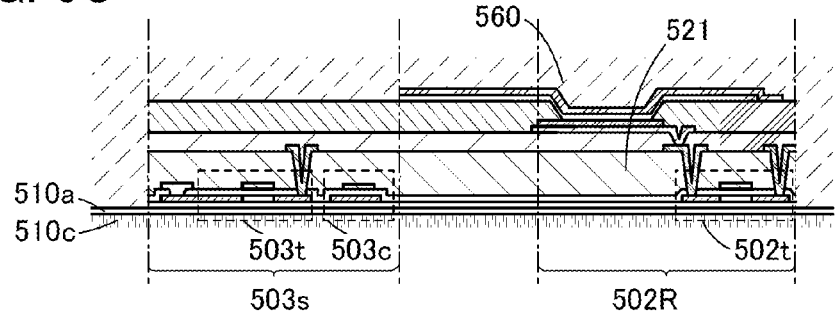

FIGS. 5A and 5B are projection views illustrating a structure of an input/output device 500 of one embodiment of the present invention. FIGS. 6A to 6C are cross-sectional views illustrating a structure of the input/output device 500 of one embodiment of the present invention.

FIG. 5A is a projection view of the input/output device 500 of one embodiment of the present invention. FIG. 5B is an enlarged projection view of a sensor unit 10U, which is part of FIG. 5A.

FIG. 6A is a cross-sectional view illustrating a cross-sectional structure of the input/output device 500 of one embodiment of the present invention along the line Z1-Z2 in FIGS. 5A and 5B. FIGS. 6B and 6C are each a cross-sectional view illustrating a cross-section of a structure which can replace part of the structure in FIG. 6A.

<Structure Example 1 of Input/Output Device>

The input/output device 500 described in this embodiment includes the input device 100 including the plurality of sensor units 10U which include the window portions 14 transmitting visible light and are arranged in a matrix, the scan lines G1 which are placed along the row direction and to which the plurality of sensor units 10U are electrically connected, the signal lines DL which are placed along the column direction and to which the plurality of sensor units 10U are electrically connected, and the base layer 16 provided with the plurality of sensor units 10U, the scan lines G1, and the signal lines DL.

The input/output device 500 also includes a display portion 501 including a plurality of pixels 502 which are arranged in a matrix and overlap with the window portions 14 and a second base layer 510 supporting the pixels 502.

In addition, the sensor unit 10U includes the first sensing element C1 overlapping with the window portion 14, the second sensing element PD not overlapping with the window portion 14, and the sensing circuit 19 which is electrically connected to the first sensing element C1 and the second sensing element PD and does not overlap with the window portion 14.

The first sensing element C1 includes the insulating layer, and the first electrode 11 and the second electrode 12 between which the insulating layer is interposed.

The second sensing element PD includes a photoelectric conversion element.

The sensing circuit 19 is supplied with the selection signal and supplies the sensing signal DATA on the basis of a change in the parasitic capacitance of the first sensing element C1 or on the basis of the current flowing through the second sensing element PD.

Through the scan line G1, the selection signal can be supplied.

Through the signal line DL, the sensing signal can be supplied.

A structure of the input/output device 500 of one embodiment of the present invention may include a coloring layer between the sensor unit 10U and the pixel 502.

The above input/output device 500 described in this embodiment includes the input device 100 including the plurality of sensor units 10U provided with the window portions 14 which transmit visible light, the display portion 501 including the plurality of pixels 502 overlapping with the window portions 14, and the coloring layer between the window portion 14 and the pixel 502.

Thus, positional data of a sensor unit and the sensing signal sensed by the sensor unit can be supplied, image data can be displayed, and image data associated with the positional data of the sensor unit can be displayed. As a result, a novel input/output device that is highly convenient or reliable can be provided.

The input/output device 500 may include the flexible printed substrate FPC1 supplied with a signal from the input device 100 and/or the flexible printed substrate FPC2 supplying a signal including image data to the display portion 501.

In addition, the protective layer 17p preventing the input/output device 500 from being scratched and/or an anti-reflective layer 567p which reduces the intensity of external light reflected by the input/output device 500 may be provided.

Moreover, the input/output device 500 includes a scan line driver circuit which supplies the selection signal to the scan line of the display portion 501, a signal line driver circuit 503s which supplies an image signal to the signal line, a wiring 511 supplying a signal, and a terminal 519 electrically connected to the flexible printed substrate FPC2.

Individual components forming the input/output device 500 are described below. Note that these components cannot be clearly distinguished and one component also serves as another component or includes part of another component in some cases.

For example, the input device 100 including the coloring layers at positions overlapping with the plurality of window portions 14 serves not only as the input device 100 but also as a color filter.

Furthermore, for example, the input/output device 500 in which the input device 100 overlaps with the display portion 501 serves not only as the input device 100 but also as the display portion 501. Note that the input/output device 500 in which the input device 100 overlaps with the display portion 501 is also referred to as a touch panel.

<<Overall Structure>>

The input/output device 500 described in this embodiment includes the input device 100 and the display portion 501.

The input device 100 includes the window portions 14, the sensor units 10U, the scan lines G1, the signal lines DL, and the base layer 16.

The sensor unit 10U includes the first sensing element C1, the second sensing element PD, and the sensing circuit 19.

The display portion 501 includes the pixels 502 and the second base layer 510.

The coloring layer may be included between the sensor unit 10U and the pixel 502.

The input/output device 500 described in this embodiment is different from the input device 100 in including the display portion 501 so that the pixels 502 overlap with the window portions 14 of the input device 100 described in Embodiment 1 with reference to FIGS. 1A and 1B and FIG. 2. Different structures are described in detail below. Refer to the above-described description for the part where the same structures can be employed.

<<Display Portion 501>>

The display portion 501 includes the plurality of pixels 502 arranged in a matrix (see FIG. 5B).

For example, the pixel 502 includes a sub-pixel 502B, a sub-pixel 502G, and a sub-pixel 502R, and each sub-pixel includes a display element and a pixel circuit that drives the display element.

In the pixel 502, the sub-pixel 502B is placed at a position overlapping with the coloring layer CFB, the sub-pixel 502G is placed at a position overlapping with the coloring layer CFG, and the sub-pixel 502R is placed at a position overlapping with the coloring layer CFR.

In this embodiment, an example of using an organic electroluminescent element that emits white light as the display element is described; however, the display element is not limited to an element.

For example, organic electroluminescent elements that emit light of different colors may be included in sub-pixels so that the light of different colors can be emitted from the respective sub-pixels.

Other than organic electroluminescent elements, any of various display elements such as display elements that perform display by an electrophoretic method (electronic ink), an electronic liquid powder (registered trademark) method, an electrowetting method, or the like; MEMS shutter display elements; optical interference type MEMS display elements; and liquid crystal elements can be used.

Furthermore, this embodiment can be used in a transmissive liquid crystal display, a transflective liquid crystal display, a reflective liquid crystal display, a direct-view liquid crystal display, or the like. In the case of a transflective liquid crystal display or a reflective liquid crystal display, some or all of pixel electrodes function as reflective electrodes. For example, some or all of pixel electrodes are formed to contain aluminum, silver, or the like. In such a case, a storage circuit such as an SRAM can be provided under the reflective electrodes, leading to lower power consumption. A structure suitable for employed display elements can be selected from among a variety of structures of pixel circuits.

In the display portion, an active matrix method in which an active element is included in a pixel or a passive matrix method in which an active element is not included in a pixel can be used.

In an active matrix method, as an active element (a non-linear element), not only a transistor but also various active elements (non-linear elements) can be used. For example, an MIM (metal insulator metal), a TFD (thin film diode), or the like can also be used. Since such an element has a small number of manufacturing steps, manufacturing cost can be reduced or yield can be improved. Alternatively, since the size of the element is small, the aperture ratio can be improved, so that power consumption can be reduced or higher luminance can be achieved.

As a method other than the active matrix method, the passive matrix method in which an active element (a non-linear element) is not used can also be used. Since an active element (a non-linear element) is not used, the number of manufacturing steps is small, so that manufacturing cost can be reduced or yield can be improved.

Alternatively, since an active element (a non-linear element) is not used, the aperture ratio can be improved, so that power consumption can be reduced or higher luminance can be achieved, for example.

<<Base Layer 510>>

For the base layer 510, a flexible material can be used. For example, the material that can be used for the base layer 16 can be used for the base layer 510.

For example, a stack in which a flexible base layer 510b, a barrier film 510a that prevents diffusion of impurities, and a resin layer 510c attaching the barrier film 510a to the base layer 510b are stacked can be preferably used for the base layer 510 (see FIG. 6A).

<<Sealant 560>>

A sealant 560 attaches the base layer 16 to the base layer 510. The sealant 560 has a higher refractive index than air. In the case of extracting light to the sealant 560 side, the sealant 560 also serves as an optical adhesive layer.

The pixel circuits and light-emitting elements (e.g., a light-emitting element 550R) are provided between the base layer 510 and the base layer 16.

<<Structure of Pixels>>

The sub-pixel 502R includes the light-emitting module 580R.

The sub-pixel 502R includes the light-emitting element 550R and the pixel circuit that can supply electric power to the light-emitting element 550R and includes a transistor 502t. Furthermore, the light-emitting module 580R includes the light-emitting element 550R and an optical element (e.g., a coloring layer CFR).

The light-emitting element 550R includes a lower electrode, an upper electrode, and a layer containing a light-emitting organic compound between the lower electrode and the upper electrode.

The light-emitting module 580R includes the coloring layer CFR on the light extraction side. The coloring layer transmits light of a particular wavelength, and, for example, a layer that selectively transmits light of red, green, or blue color can be used. Note that other sub-pixels may be provided so as to overlap with the window portions, which are not provided with the coloring layers, so that light from the light-emitting element can be emitted without passing through the coloring layers.

In the case where the sealant 560 is provided on the light extraction side, the sealant 560 is in contact with the light-emitting element 550R and the coloring layer CFR.

The coloring layer CFR is placed at a position overlapping with the light-emitting element 550R. Accordingly, part of light emitted from the light-emitting element 550R passes through the coloring layer CFR and is emitted to the outside of the light-emitting module 580R as indicated by an arrow in the figure.

The light-blocking layer BM is located so as to surround the coloring layer (e.g., the coloring layer CFR).

<<Structure of Pixel Circuit>>

An insulating film 521 covering the transistor 502t included in the pixel circuit is provided. The insulating film 521 can be used as a layer for planarizing unevenness due to the pixel circuit. A stacked-layer film including a layer that can prevent diffusion of impurities can be used as the insulating film 521. This can prevent the reliability of the transistor 502t or the like from being lowered by diffusion of impurities.

The lower electrode is placed over the insulating film 521, and a partition wall 528 is provided over the insulating film 521 so as to overlap with an end portion of the lower electrode.

The lower electrode is included in the light-emitting element (e.g., the light-emitting element 550R); the layer containing a light-emitting organic compound is provided between the upper electrode and the lower electrode. The pixel circuit supplies power to the light-emitting element.

Furthermore, a spacer that adjusts the gap between the base layer 16 and the base layer 510 is provided over the partition wall 528.

<<Configuration of Scan Line Driver Circuit>>

A scan line driver circuit 503s includes a transistor 503t and a capacitor 503c. Note that transistors used in the pixel circuit and the driver circuit can be formed in the same process and over the same substrate.

<<Converter CONV>>

Any of various circuits that can convert the sensing signal DATA supplied from the sensing unit 10U and supply a signal obtained by the conversion to the flexible printed substrate FPC1 can be used for a converter CONV (see FIG. 3B).

For example, the sixth transistor M6 can be used in the converter CONV.

<<Other Components>>

The display portion 501 includes an anti-reflective layer 567p at a position overlapping with pixels. As the anti-reflective layer 567p, a circular polarizing plate can be used, for example.

The display portion 501 includes the wirings 511 through which signals are supplied. The wirings 511 are provided with the terminal 519. Note that the flexible printed substrate FPC2 through which a signal such as an image signal or a synchronization signal can be supplied is electrically connected to the terminal 519.

Note that a printed wiring board (PWB) may be attached to the flexible printed substrate FPC2.

The display portion 501 includes wirings such as scan lines, signal lines, and power supply lines. Any of various conductive films can be used for the wirings.

Specifically, a metal element selected from aluminum, chromium, copper, tantalum, titanium, molybdenum, tungsten, nickel, yttrium, zirconium, silver, and manganese; an alloy containing any of the above-described metal elements; an alloy containing any of the above-described metal elements in combination; or the like can be used. In particular, one or more elements selected from aluminum, chromium, copper, tantalum, titanium, molybdenum, and tungsten are preferably contained. In particular, an alloy of copper and manganese is suitably used in microfabrication with the use of a wet etching method.

Specifically, a stacked-layer film in which a film of an element selected from titanium, tantalum, tungsten, molybdenum, chromium, neodymium, and scandium is stacked over an aluminum film can be used. Alternatively, a stacked-layer film in which an alloy film containing a plurality of elements selected from titanium, tantalum, tungsten, molybdenum, chromium, neodymium, and scandium is stacked over an aluminum film can be used. Alternatively, a stacked-layer film in which a nitride film of an element selected from titanium, tantalum, tungsten, molybdenum, chromium, neodymium, and scandium is stacked over an aluminum film can be used.

Specifically, a stacked-layer structure in which a film of an element selected from titanium, tantalum, tungsten, molybdenum, chromium, neodymium, and scandium, or an alloy film or nitride film in which a plurality of elements selected from titanium, tantalum, tungsten, molybdenum, chromium, neodymium, and scandium are combined is stacked over an aluminum film can be used.

Alternatively, a light-transmitting conductive material containing indium oxide, tin oxide, or zinc oxide may be used.

<Modification Example of Display Portion>

Any of various kinds of transistors can be used in the display portion 501.

A structure of the case of using bottom-gate transistors in the display portion 501 is illustrated in FIGS. 6A and 6B.

For example, a semiconductor layer containing an oxide semiconductor, amorphous silicon, or the like can be used in the transistor 502t and the transistor 503t illustrated in FIG. 6A.

For example, a film represented by an In-M-Zn oxide which contains at least indium (In), zinc (Zn), and M (a metal such as Al, Ga, Ge, Y, Zr, Sn, La, Ce, or Hf) is preferably included. Alternatively, both In and Zn are preferably contained.

As a stabilizer, gallium (Ga), tin (Sn), hafnium (Hf), aluminum (Al), zirconium (Zr), and the like can be given. As another stabilizer, lanthanoid such as lanthanum (La), cerium (Ce), praseodymium (Pr), neodymium (Nd), samarium (Sm), europium (Eu), gadolinium (Gd), terbium (Tb), dysprosium (Dy), holmium (Ho), erbium (Er), thulium (Tm), ytterbium (Yb), or lutetium (Lu) can be given.

As the oxide semiconductor included in the oxide semiconductor film, any of the following can be used: an In—Ga—Zn-based oxide, an In—Al—Zn-based oxide, an In—Sn—Zn-based oxide, an In—Hf—Zn-based oxide, an In—La—Zn-based oxide, an In—Ce—Zn-based oxide, an In—Pr—Zn-based oxide, an In—Nd—Zn-based oxide, an In—Sm—Zn-based oxide, an In—Eu—Zn-based oxide, an In—Gd—Zn-based oxide, an In—Tb—Zn-based oxide, an In—Dy—Zn-based oxide, an In—Ho—Zn-based oxide, an In—Er—Zn-based oxide, an In—Tm—Zn-based oxide, an In—Yb—Zn-based oxide, an In—Lu—Zn-based oxide, an In—Sn—Ga—Zn-based oxide, an In—Hf—Ga—Zn-based oxide, an In—Al—Ga—Zn-based oxide, an In—Sn—Al—Zn-based oxide, an In—Sn—Hf—Zn-based oxide, an In—Hf—Al—Zn-based oxide, and an In—Ga-based oxide.

Note that here, for example, an "In—Ga—Zn-based oxide" means an oxide containing In, Ga, and Zn as its main components and there is no limitation on the ratio of In:Ga:Zn. The In—Ga—Zn-based oxide may contain another metal element in addition to In, Ga, and Zn.

For example, a semiconductor layer containing polycrystalline silicon that is obtained by crystallization process such as laser annealing can be used in the transistor 502t and the transistor 503t illustrated in FIG. 6B.

A structure of the case of using top-gate transistors in the display portion 501 is illustrated in FIG. 6C.

For example, a semiconductor layer containing polycrystalline silicon, a single crystal silicon film that is transferred from a single crystal silicon substrate, or the like can be used in the transistor 502t and the transistor 503t illustrated in FIG. 6C.

This embodiment can be combined with any of the other embodiments described in this specification as appropriate.

(Embodiment 5)

In this embodiment, a structure of a transistor that can be used in a sensing circuit of one embodiment of the present invention or the like is described with reference to FIGS. 7A to 7C.

Figure 7A:
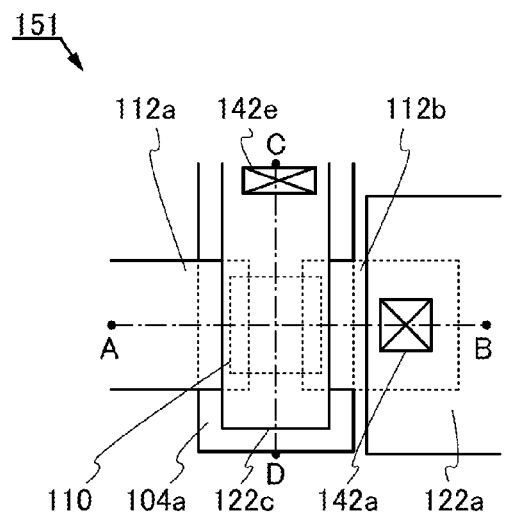
FIGS. 7A to 7C illustrate a structure of a transistor that can be used in a sensing circuit according to one embodiment.
Figure 7C:
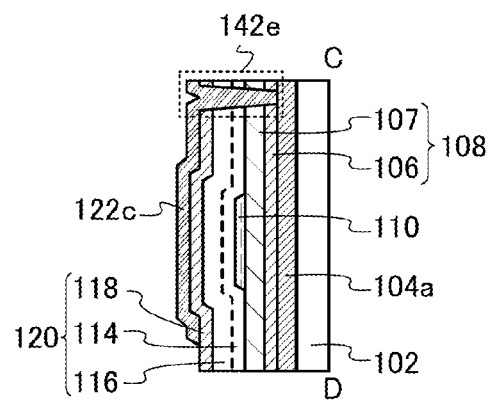
Figure 7B:
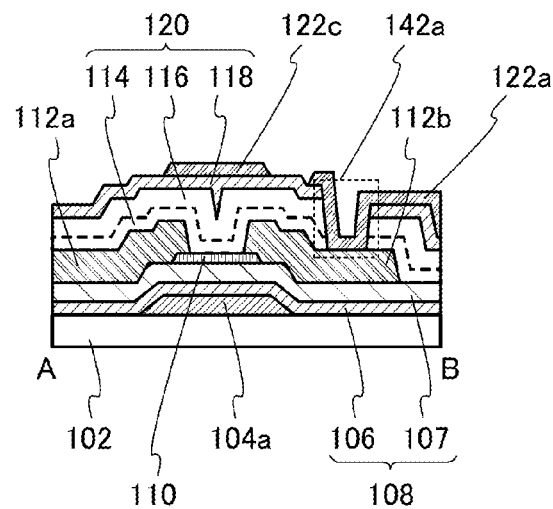

FIGS. 7A to 7C are a top view and cross-sectional views of the transistor 151. FIG. 7A is a top view of the transistor 151, FIG. 7B is a cross-sectional view taken along dashed-dotted line A-B in FIG. 7A, and FIG. 7C is a cross-sectional view taken along dashed-dotted line C-D in FIG. 7A. Note that in FIG. 7A, some components are not illustrated for clarity.

Note that in this embodiment, the first electrode refers to one of a source and a drain of a transistor, and the second electrode refers to the other.

The transistor 151 includes a gate electrode 104a provided over a substrate 102, a first insulating film 108 that includes insulating films 106 and 107 and is formed over the substrate 102 and the gate electrode 104a, an oxide semiconductor film 110 overlapping with the gate electrode 104a with the first insulating film 108 provided therebetween, and a first electrode 112a and a second electrode 112b in contact with the oxide semiconductor film 110.

In addition, over the first insulating film 108, the oxide semiconductor film 110, the first electrode 112a, and the second electrode 112b, a second insulating film 120 including insulating films 114, 116, and 118 and a gate electrode 122c formed over the second insulating film 120 are provided.

The gate electrode 122c is connected to the gate electrode 104a in an opening portion 142e provided in the first insulating film 108 and the second insulating film 120. In addition, a conductive film 122a serving as a pixel electrode is formed over the insulating film 118. The conductive film 122a is connected to the second electrode 112b through an opening portion 142a provided in the second insulating film 120.

Note that the first insulating film 108 serves as a first gate insulating film of the transistor 151, and the second insulating film 120 serves as a second gate insulating film of the transistor 151. Furthermore, the conductive film 122a serves as a pixel electrode.

In the transistor 151 of one embodiment of the present invention, in the channel width direction, the oxide semiconductor film 110 between the first insulating film 108 and the second insulating film 120 is provided between the gate electrode 104a and the gate electrode 122c. In addition, as illustrated in FIG. 7A, the gate electrode 104a overlaps with side surfaces of the oxide semiconductor film 110 with the first insulating film 108 provided therebetween, when seen from the above.

A plurality of opening portions is provided in the first insulating film 108 and the second insulating film 120. Typically, as illustrated in FIG. 7B, the opening portion 142a through which part of the second electrode 112b is exposed is provided. Furthermore, the opening portion 142e is provided as illustrated in FIG. 7C.

In the opening portion 142a, the second electrode 112b is connected to the conductive film 122a.

In addition, in the opening portion 142e, the gate electrode 104a is connected to the gate electrode 122c.

When the gate electrode 104a and the gate electrode 122c are included and the same potential is applied to the gate electrode 104a and the gate electrode 122c, carriers flow in a wide region in the oxide semiconductor film 110. Accordingly, the amount of carriers that move in the transistor 151 increases.

As a result, the on-state current of the transistor 151 is increased, and the field-effect mobility is increased to greater than or equal to 10 $cm^2/V \cdot s$ or to greater than or equal to 20 $cm^2/V \cdot s$, for example. Note that here, the field-effect mobility is not an approximate value of the mobility as the physical property of the oxide semiconductor film but is the apparent field-effect mobility in a saturation region of the transistor, which is an indicator of current drive capability.

An increase in field-effect mobility becomes significant when the channel length (also referred to as L length) of the transistor is longer than or equal to 0.5 μm and shorter than or equal to 6.5 μm, preferably longer than 1 μm and shorter than 6 μm, further preferably longer than 1 μm and shorter than or equal to 4 μm, still further preferably longer than 1 μm and shorter than or equal to 3.5 μm, yet still further preferably longer than 1 μm and shorter than or equal to 2.5 μm. Furthermore, with a short channel length longer than or equal to 0.5 μm and shorter than or equal to 6.5 μm, the channel width can also be short.

The transistor includes the gate electrode 104a and the gate electrode 122c, each of which has a function of blocking an external electric field; thus, charges such as a charged particle between the substrate 102 and the gate electrode 104a and over the gate electrode 122c do not affect the oxide semiconductor film 110. Thus, degradation due to a stress test (e.g., a negative gate bias temperature (−GBT) stress test in which a negative potential is applied to a gate electrode) can be reduced, and changes in the rising voltages of on-state current at different drain voltages can be suppressed.

The BT stress test is one kind of accelerated test and can evaluate, in a short time, change in characteristics (i.e., a change over time) of transistors, which is caused by long-term use. In particular, the amount of change in threshold voltage of a transistor between before and after the BT stress test is an important indicator when examining the reliability of the transistor. If the amount of change in the threshold voltage between before and after the BT stress test is small, the transistor has higher reliability.

The substrate 102 and individual components included in the transistor 151 are described below.

<<Substrate 102>>

For the substrate 102, a glass material such as aluminosilicate glass, aluminoborosilicate glass, or barium borosilicate glass is used. In the mass production, for the substrate 102, a mother glass with any of the following sizes is preferably used: the 8-th generation (2160 mm×2460 mm), the 9-th generation (2400 mm×2800 mm or 2450 mm×3050 mm), the 10-th generation (2950 mm×3400 mm), and the like. High process temperature and a long period of process time drastically shrink the mother glass. Thus, in the case where mass production is performed with the use of the mother glass, it is preferable that the heat process in the manufacturing process be performed at a temperature lower than or equal to 600° C., preferably lower than or equal to 450° C., further preferably lower than or equal to 350° C.

<<Gate Electrode 104a>>

As a material used for the gate electrode 104a, a metal element selected from aluminum, chromium, copper, tantalum, titanium, molybdenum, and tungsten, an alloy containing any of these metal elements as a component, an alloy containing these metal elements in combination, or the like can be used. The material used for the gate electrode 104a may have a single-layer structure or a stacked-layer structure of two or more layers. For example, a two-layer structure in which a titanium film is stacked over an aluminum film, a two-layer structure in which a titanium film is stacked over a titanium nitride film, a two-layer structure in which a tungsten film is stacked over a titanium nitride film, a two-layer structure in which a tungsten film is stacked over a tantalum nitride film or a tungsten nitride film, a three-layer structure in which a titanium film, an aluminum film, and a titanium film are stacked in this order, and the like can be given. A stacked-layer structure in which a film of an element selected from titanium, tantalum, tungsten, molybdenum, chromium, neodymium, and scandium or an alloy film or nitride film in which a plurality of elements selected from titanium, tantalum, tungsten, molybdenum, chromium, neodymium, and scandium are combined is stacked over an aluminum film may be used. The material used for the gate electrode 104a can be formed by a sputtering method, for example.

<<First Insulating Film 108>>

An example in which the first insulating film 108 has a two-layer structure of the insulating film 106 and the insulating film 107 is illustrated. Note that the structure of the first insulating film 108 is not limited thereto, and for example, the first insulating film 108 may have a single-layer structure or a stacked-layer structure including three or more layers.

The insulating film 106 is formed with a single-layer structure or a stacked-layer structure using, for example, any of a silicon nitride oxide film, a silicon nitride film, an aluminum oxide film, and the like with a PE-CVD apparatus. In the case where the insulating film 106 has a stacked-layer structure, it is preferable that a silicon nitride film with fewer defects be provided as a first silicon nitride film, and a silicon nitride film from which hydrogen and ammonia are less likely to be released be provided over the first silicon nitride film, as a second silicon nitride film. As a result, hydrogen and nitrogen contained in the insulating film 106 can be inhibited from moving or diffusing into the oxide semiconductor film 110 to be formed later.

The insulating film 107 is formed with a single-layer structure or a stacked-layer structure using any of a silicon oxide film, a silicon oxynitride film, and the like with a PE-CVD apparatus, for example.

The first insulating film 108 can have a stacked-layer structure, for example, in which a 400-nm-thick silicon nitride film used as the insulating film 106 and a 50-nm-thick silicon oxynitride film used as the insulating film 107 are formed in this order. The silicon nitride film and the silicon oxynitride film are preferably formed in succession in a vacuum, in which case entry of impurities is suppressed. The first insulating film 108 in a position overlapping with the gate electrode 104a serves as a gate insulating film of the transistor 151. Note that silicon nitride oxide refers to an insulating material that contains more nitrogen than oxygen, whereas silicon oxynitride refers to an insulating material that contains more oxygen than nitrogen.

<<Oxide Semiconductor Film 110>>

For the oxide semiconductor film 110 an oxide semiconductor is preferably used. As the oxide semiconductor, a film represented by an In-M-Zn oxide that contains at least indium (In), zinc (Zn), and M (a metal such as Al, Ga, Ge, Y, Zr, Sn, La, Ce, or Hf) is preferably included. Alternatively, both In and Zn are preferably contained. In order to reduce fluctuations in electrical characteristics of the transistors including the oxide semiconductor, the oxide semiconductor preferably contains a stabilizer in addition to In and Zn.

As a stabilizer, gallium (Ga), tin (Sn), hafnium (Hf), aluminum (Al), zirconium (Zr), and the like can be given. As another stabilizer, lanthanoid such as lanthanum (La), cerium (Ce), praseodymium (Pr), neodymium (Nd), samarium (Sm), europium (Eu), gadolinium (Gd), terbium (Tb), dysprosium (Dy), holmium (Ho), erbium (Er), thulium (Tm), ytterbium (Yb), or lutetium (Lu) can be given.

As the oxide semiconductor included in the oxide semiconductor film 110, any of the following can be used: an In—Ga—Zn-based oxide, an In—Al—Zn-based oxide, an In—Sn—Zn-based oxide, an In—Hf—Zn-based oxide, an In—La—Zn-based oxide, an In—Ce—Zn-based oxide, an In—Pr—Zn-based oxide, an In—Nd—Zn-based oxide, an In—Sm—Zn-based oxide, an In—Eu—Zn-based oxide, an In—Gd—Zn-based oxide, an In—Tb—Zn-based oxide, an In—Dy—Zn-based oxide, an In—Ho—Zn-based oxide, an In—Er—Zn-based oxide, an In—Tm—Zn-based oxide, an In—Yb—Zn-based oxide, an In—Lu—Zn-based oxide, an In—Sn—Ga—Zn-based oxide, an In—Hf—Ga—Zn-based oxide, an In—Al—Ga—Zn-based oxide, an In—Sn—Al—Zn-based oxide, an In—Sn—Hf—Zn-based oxide, and an In—Hf—Al—Zn-based oxide.

Note that here, for example, an "In—Ga—Zn-based oxide" means an oxide containing In, Ga, and Zn as its main components and there is no limitation on the ratio of In:Ga:Zn. The In—Ga—Zn-based oxide may contain another metal element in addition to In, Ga, and Zn.

The oxide semiconductor film 110 can be formed by a sputtering method, a molecular beam epitaxy (MBE) method, a CVD method, a pulse laser deposition method, an atomic layer deposition (ALD) method, or the like as appropriate. In particular, the oxide semiconductor film 110 is preferably formed by the sputtering method because the oxide semiconductor film 110 can be dense.

In the formation of an oxide semiconductor film as the oxide semiconductor film 110, the hydrogen concentration in the oxide semiconductor film is preferably reduced as much as possible. To reduce the hydrogen concentration, for example, in the case of a sputtering method, a deposition chamber needs to be highly evacuated and also a sputtering gas needs to be highly purified. As an oxygen gas or an argon gas used for a sputtering gas, a gas which is highly purified to have a dew point of −40° C. or lower, preferably −80° C. or lower, further preferably −100° C. or lower, or still further preferably −120° C. or lower is used, whereby entry of moisture or the like into the oxide semiconductor film can be minimized.

In order to remove moisture remaining in the deposition chamber, an entrapment vacuum pump, such as a cryopump, an ion pump, or a titanium sublimation pump, is preferably used. A turbo molecular pump provided with a cold trap may be alternatively used. When the deposition chamber is evacuated with a cryopump, which has a high capability in removing a hydrogen molecule, a compound including a hydrogen atom such as water ($H_2O$) (preferably a compound containing a carbon atom) and the like, the concentration of an impurity to be contained in a film formed in the deposition chamber can be reduced.

When the oxide semiconductor film as the oxide semiconductor film 110 is formed by a sputtering method, the relative density (filling factor) of a metal oxide target that is used for the film formation is greater than or equal to 90% and less than or equal to 100%, preferably greater than or equal to 95% and less than or equal to 100%. With the use of the metal oxide target having high relative density, a dense oxide semiconductor film can be formed.

Note that to reduce the impurity concentration of the oxide semiconductor film, it is also effective to form the oxide semiconductor film as the oxide semiconductor film 110 while the substrate 102 is kept at high temperature. The heating temperature of the substrate 102 may be higher than or equal to 150° C. and lower than or equal to 450° C., and preferably the substrate temperature is higher than or equal to 200° C. and lower than or equal to 350° C.

Next, first heat treatment is preferably performed. The first heat treatment may be performed at a temperature higher than or equal to 250° C. and lower than or equal to 650° C., preferably higher than or equal to 300° C. and lower than or equal to 500° C., in an inert gas atmosphere, an atmosphere containing an oxidizing gas at 10 ppm or more, or a reduced pressure state. Alternatively, the first heat treatment may be performed in such a manner that heat treatment is performed in an inert gas atmosphere, and then another heat treatment is performed in an atmosphere containing an oxidizing gas at 10 ppm or more, in order to compensate for desorbed oxygen. By the first heat treatment, the crystallinity of the oxide semiconductor that is used as the oxide semiconductor film 110 can be improved, and in addition, impurities such as hydrogen and water can be removed from the first insulating film 108 and the oxide semiconductor film 110. The first heat treatment may be performed before the oxide semiconductor film 110 is processed into an island shape.

<<First Electrode and Second Electrode>>

The first electrode 112a and the second electrode 112b can be formed using a conductive film 112 having a single-layer structure or a stacked-layer structure with any of metals such as aluminum, titanium, chromium, nickel, copper, yttrium, zirconium, molybdenum, silver, tantalum, and tungsten, or an alloy containing any of these metals as its main component. In particular, one or more elements selected from aluminum, chromium, copper, tantalum, titanium, molybdenum, and tungsten are preferably included. For example, a two-layer structure in which a titanium film is stacked over an aluminum film, a two-layer structure in which a titanium film is stacked over a tungsten film, a two-layer structure in which a copper film is formed over a copper-magnesium-aluminum alloy film, a three-layer structure in which a titanium film or a titanium nitride film, an aluminum film or a copper film, and a titanium film or a titanium nitride film are stacked in this order, a three-layer structure in which a molybdenum film or a molybdenum nitride film, an aluminum film or a copper film, and a molybdenum film or a molybdenum nitride film are stacked in this order, and the like can be given. Note that a transparent conductive material containing indium oxide, tin oxide, or zinc oxide may be used. The conductive film can be formed by a sputtering method, for example.

<<Insulating Films 114 and 116>>

An example in which the second insulating film 120 has a three-layer structure of the insulating films 114, 116, and 118 is illustrated. Note that the structure of the second insulating film 120 is not limited thereto, and for example, the second insulating film 120 may have a single-layer structure or a stacked-layer structure including two layers or four or more layers.

For the insulating films 114 and 116, an inorganic insulating material containing oxygen can be used in order to improve the characteristics of the interface with the oxide semiconductor used for the oxide semiconductor film 110. As examples of the inorganic insulating material containing oxygen, a silicon oxide film, a silicon oxynitride film, and the like can be given. The insulating films 114 and 116 can be formed by a PE-CVD method, for example.

The thickness of the insulating film 114 can be greater than or equal to 5 nm and less than or equal to 150 nm, preferably greater than or equal to 5 nm and less than or equal to 50 nm, more preferably greater than or equal to 10 nm and less than or equal to 30 nm. The thickness of the insulating film 116 can be greater than or equal to 30 nm and less than or equal to 500 nm, preferably greater than or equal to 150 nm and less than or equal to 400 nm.

Furthermore, the insulating films 114 and 116 can be formed using insulating films formed of the same kinds of materials; thus, a boundary between the insulating films 114 and 116 cannot be clearly observed in some cases. Thus, in this embodiment, the boundary between the insulating films 114 and 116 is shown by a dashed line. Although a two-layer structure of the insulating films 114 and 116 is described in this embodiment, the present invention is not limited to this. For example, a single-layer structure of the insulating film 114, a single-layer structure of the insulating film 116, or a stacked-layer structure including three or more layers may be used.

The insulating film 118 is a film formed using a material that can prevent an external impurity, such as water, alkali metal, or alkaline earth metal, from diffusing into the oxide semiconductor film 110, and that further contains hydrogen.

For example, a silicon nitride film, a silicon nitride oxide film, or the like having a thickness of greater than or equal to 150 nm and less than or equal to 400 nm can be used as the insulating film 118. In this embodiment, a 150-nm-thick silicon nitride film is used as the insulating film 118.

The silicon nitride film is preferably formed at a high temperature to have an improved blocking property against impurities or the like; for example, the silicon nitride film is preferably formed at a temperature in the range from the substrate temperature of 100° C. to the strain point of the substrate, more preferably at a temperature in the range from 300° C. to 400° C. When the silicon nitride film is formed at a high temperature, a phenomenon in which oxygen is released from the oxide semiconductor used for the oxide semiconductor film 110 and the carrier concentration is increased is caused in some cases; therefore, the upper limit of the temperature is a temperature at which the phenomenon is not caused.

<<Conductive Film 122a and Gate Electrode 122c>>

For the conductive film used as the conductive film 122a and the gate electrode 122c, an oxide containing indium may be used. For example, a light-transmitting conductive material such as indium oxide containing tungsten oxide, indium zinc oxide containing tungsten oxide, indium oxide containing titanium oxide, indium tin oxide containing titanium oxide, indium tin oxide (hereinafter referred to as ITO), indium zinc oxide, or indium tin oxide to which silicon oxide is added can be used. The conductive film that can be used as the conductive films 122a and 122b can be formed by a sputtering method, for example.

Note that the structures, methods, and the like described in this embodiment can be used as appropriate in combination with any of the structures, methods, and the like described in the other embodiments.

(Embodiment 6)

In this embodiment, a method of manufacturing a stack that can be used in the manufacture of the input device or input/output device of one embodiment of the present invention is described with reference to FIGS. 8A1 to 8E2.

FIGS. 8A1 to 8E2 are schematic views illustrating a process of manufacturing the stack. Cross-sectional views illustrating structures of a processed member and the stack are shown on the left side of FIGS. 8A1 to 8E2, and top views corresponding to the cross-sectional views except FIG. 8C are shown on the right side.

<Method of Manufacturing Stack>

A method of manufacturing a stack 81 from a processed member 80 is described with reference to FIGS. 8A1 to 8E2.

The processed member 80 includes a first substrate F1, a first separation layer F2 on the first substrate F1, a first layer F3 to be separated whose one surface is in contact with the first separation layer F2, a bonding layer 30 whose one surface is in contact with the other surface of the first layer F3 to be separated, and a base layer S5 in contact with the other surface of the bonding layer 30 (see FIGS. 8A1 and 8A2).

Note that a structure of the processed member 80 is described in detail in Embodiment 7.

<<Formation of Separation Starting Points>>

The processed member 80 in which separation starting points F3s are formed in the vicinity of edges of the bonding layer 30 is prepared.

The separation starting points F3s are formed by separating part of the first layer F3 to be separated, from the first substrate F1.

Part of the first layer F3 to be separated can be separated from the separation layer F2 by inserting a sharp tip into the first layer F3 to be separated, from the first substrate F1 side, or by a method using a laser or the like (e.g., a laser ablation method).

Thus, the separation starting point F3s can be formed.

<<First Step>>

The processed member 80 in which the separation starting points F3s are formed in the vicinity of the edges of the bonding layer 30 in advance is prepared (see FIGS. 8B1 and 8B2).

<<Second Step>>

One surface layer 80b of the processed member 80 is separated. As a result, a first remaining portion 80a is obtained from the processed member 80.

Specifically, from the separation starting point F3s formed in the vicinity of the edge of the bonding layer 30, the first substrate F1, together with the first separation layer F2, is separated from the first layer F3 to be separated (see FIG. 8C). Consequently, the first remaining portion 80a including the first layer F3 to be separated, the bonding layer 30 whose one surface is in contact with the first layer F3 to be separated, and the base layer S5 in contact with the other surface of the bonding layer 30 is obtained.

The separation may be performed while the vicinity of the interface between the first separation layer F2 and the first layer F3 to be separated is irradiated with ions to remove static electricity. Specifically, the ions may be generated by an ionizer.

Furthermore, when the first layer F3 to be separated is separated from the first separation layer F2, a liquid is injected into the interface between the first separation layer F2 and the first layer F3 to be separated. Alternatively, a liquid may be ejected and sprayed by a nozzle 99. For example, as the injected liquid or the sprayed liquid, water, a polar solvent, or the like can be used.

By injecting the liquid, an influence of static electricity and the like generated with the separation can be reduced. Alternatively, the separation may be performed while a liquid that dissolves the separation layer is injected.

In particular, in the case where a film containing tungsten oxide is used as the first separation layer F2, the first layer F3 to be separated is preferably separated while a liquid containing water is injected or sprayed because a stress applied to the first layer F3 to be separated due to the separation can be reduced.

<<Third Step>>

A first adhesive layer 31 is formed on the first remaining portion 80a and the first remaining portion 80a is bonded to a first support 41 with the first adhesive layer 31 (see FIGS. 8D1 and 8D2). Consequently, the stack 81 is obtained from the first remaining portion 80a.

Specifically, the stack 81 including the first support 41, the first adhesive layer 31, the first layer F3 to be separated, the bonding layer 30 whose one surface is in contact with the first layer F3 to be separated, and the base layer S5 in contact with the other surface of the bonding layer 30 is obtained (see FIGS. 8E1 and 8E2).

To form the bonding layer 30, any of a variety of methods can be used. For example, the bonding layer 30 can be formed with a dispenser, by a screen printing method, or the like. The bonding layer 30 is cured by a method selected depending on its material. For example, when a light curable adhesive is used for the bonding layer 30, light including light of a predetermined wavelength is emitted.

This embodiment can be combined with any of the other embodiments described in this specification as appropriate.

(Embodiment 7)

In this embodiment, a method of manufacturing a stack that can be used in the manufacture of the input device or input/output device of one embodiment of the present invention is described with reference to FIGS. 9A1 to 9E2 and FIGS. 10A1 to 10E2.

FIGS. 9A1 to 9E2 and FIGS. 10A1 to 10E2 are schematic views illustrating a process of manufacturing the stack. Cross-sectional views illustrating structures of a processed member and the stack are shown on the left side of FIGS. 9A1 to 9E2 and FIGS. 10A1 to 10E2, and top views corresponding to the cross-sectional views except FIG. 9C and FIGS. 10B and 10C are shown on the right side.

<Method of Manufacturing Stack>

A method of manufacturing a stack 92 from a processed member 90 is described with reference to FIGS. 9A1 to 9E2 and FIGS. 10A1 to 10E2.

The processed member 90 is different from the processed member 80 in that the other surface of the bonding layer 30 is in contact with one surface of a second layer S3 to be separated instead of the material S5.

Specifically, the difference is that the second substrate S1 instead of the base layer S5, a second separation layer S2 over the second substrate S1, and the second layer S3 to be separated whose other surface is in contact with the second separation layer S2 are included, and that one surface of the second layer S3 to be separated is in contact with the other surface of the bonding layer 30.

In the processed member 90, the first substrate F1, the first separation layer F2, the first layer F3 to be separated whose one surface is in contact with the first separation layer F2, the bonding layer 30 whose one surface is in contact with the other surface of the first layer F3 to be separated, the second layer S3 to be separated whose one surface is in contact with the other surface of the bonding layer 30, the second separation layer S2 whose one surface is in contact with the other surface of the second layer S3 to be separated, and the second substrate S1 are placed in this order (see FIGS. 9A1 and 9A2).

Note that a structure of the processed member 90 is described in detail in Embodiment 7.

<<First Step>>

The processed member 90 in which the separation starting points F3s are formed in the vicinity of the edges of the bonding layer 30 is prepared (see FIGS. 9B1 and 9B2).

The separation starting point F3s is formed by separating part of the first layer F3 to be separated, from the first substrate F1.

For example, part of the first layer F3 to be separated can be separated from the separation layer F2 by inserting a sharp tip into the first layer F3 to be separated, from the first substrate F1 side, or by a method using a laser or the like (e.g., a laser ablation method). Thus, the separation starting point F3s can be formed.

<<Second Step>>

One surface layer 90b of the processed member 90 is separated. As a result, a first remaining portion 90a is obtained from the processed member 90.

Figure 9C:
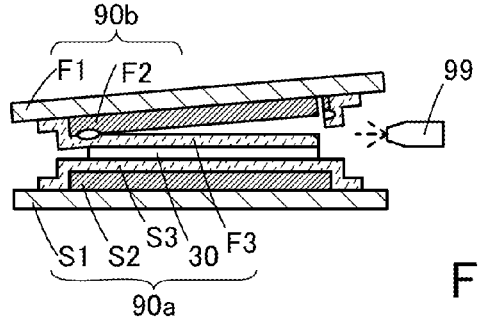

Specifically, from the separation starting point F3s formed in the vicinity of the edge of the bonding layer 30, the first substrate F1, together with the first separation layer F2, is separated from the first layer F3 to be separated (see FIG. 9C). Consequently, the first remaining portion 90a in which the first layer F3 to be separated, the bonding layer 30 whose one surface is in contact with the first layer F3 to be separated, the second layer S3 to be separated whose one surface is in contact with the other surface of the bonding layer 30, the second separation layer S2 whose one surface is in contact with the other surface of the second layer S3 to be separated, and the second substrate S1 are placed in this order is obtained.

Note that the separation may be performed while the vicinity of the interface between the second separation layer S2 and the second layer S3 to be separated is irradiated with ions to remove static electricity. Specifically, the ions may be generated by an ionizer.

Furthermore, when the second layer S3 to be separated is separated from the second separation layer S2, a liquid is injected into the interface between the second separation layer S2 and the second layer S3 to be separated. Alternatively, a liquid may be ejected and sprayed by a nozzle 99. For example, as the liquid to be injected or the liquid to be sprayed, water, a polar solvent, or the like can be used.

By injecting the liquid, an influence of static electricity and the like generated with the separation can be reduced. Alternatively, the separation may be performed while a liquid that dissolves the separation layer is injected.

In particular, in the case where a film containing tungsten oxide is used as the second separation layer S2, the second layer S3 to be separated is preferably separated while a liquid containing water is injected or sprayed because a stress applied to the second layer S3 to be separated due to the separation can be reduced.

<<Third Step>>

A first adhesive layer 31 is formed on the first remaining portion 90a (see FIGS. 9D1 and 9D2), and the first remaining portion 90a is bonded to a first support 41 with the first adhesive layer 31. Consequently, a stack 91 is obtained from the first remaining portion 90a.

Specifically, the stack 91 in which the first support 41, the first adhesive layer 31, the first layer F3 to be separated, the bonding layer 30 whose one surface is in contact with the first layer F3 to be separated, the second layer S3 to be separated whose one surface is in contact with the other surface of the bonding layer 30, the second separation layer S2 whose one surface is in contact with the other surface of the second layer S3 to be separated, and the second substrate S1 are placed in this order is obtained (see FIGS. 9E1 and 9E2).

<<Sixth Step>>

Part of the second layer S3 to be separated in the vicinity of the edge of the first adhesive layer 31 of the stack 91 is separated from the second substrate S1 to form a second separation starting point 91s.

For example, the first support 41 and the first adhesive layer 31 are cut from the first support 41 side, and part of the second layer S3 to be separated is separated from the second substrate S1 along an edge of the first adhesive layer 31 which is newly formed.

Specifically, the first adhesive layer 31 and the first support 41 in a region which is over the second separation layer S2 and in which the second layer S3 to be separated is provided are cut with a blade or the like including a sharp tip, and along a newly formed edge of the first adhesive layer 31, the second layer S3 to be separated is partly separated from the second substrate S1 (see FIGS. 10A1 and 10A2).

Consequently, the separation starting points 91s are formed in the vicinity of newly formed edges of the first support 41b and the first adhesive layer 31.

<<Seventh Step>>

A second remaining portion 91a is separated from the stack 91. As a result, the second remaining portion 91a is obtained from the stack 91 (see FIG. 10C).

Specifically, from the separation starting point 91s formed in the vicinity of the edge of the first adhesive layer 31, the second substrate S1, together with the second separation layer S2, is separated from the second layer S3 to be separated. Consequently, the second remaining portion 91a in which the first support 41b, the first adhesive layer 31, the first layer F3 to be separated, the bonding layer 30 whose one surface is in contact with the first layer F3 to be separated, and the second layer S3 to be separated whose one surface is in contact with the other surface of the bonding layer 30 are placed in this order is obtained.

Note that the separation may be performed while the vicinity of the interface between the second separation layer S2 and the second layer S3 to be separated is irradiated with ions to remove static electricity. Specifically, the ions may be generated by an ionizer.

Furthermore, when the second layer S3 to be separated is separated from the second separation layer S2, a liquid is injected into the interface between the second separation layer S2 and the second layer S3 to be separated. Alternatively, a liquid may be ejected and sprayed by a nozzle 99. For example, as the liquid to be injected or the liquid to be sprayed, water, a polar solvent, or the like can be used.

By injecting the liquid, an influence of static electricity and the like generated with the separation can be reduced. Alternatively, the separation may be performed while a liquid that dissolves the separation layer is injected.

In particular, in the case where a film containing tungsten oxide is used as the second separation layer S2, the second layer S3 to be separated is preferably separated while a liquid containing water is injected or sprayed because a stress applied to the second layer S3 to be separated due to the separation can be reduced.

<<Ninth Step>>

A second adhesive layer 32 is formed on the second remaining portion 91a (see FIGS. 10D1 and 10D2).

The second remaining portion 91a is bonded to the second support 42 with the second adhesive layer 32. Consequently, a stack 92 is obtained from the second remaining portion 91a (see FIGS. 10E1 and 10E2).

Specifically, the stack 92 in which first support 41b, the first adhesive layer 31, the first layer F3 to be separated, the bonding layer 30 whose one surface is in contact with the first layer F3 to be separated, the second layer S3 to be separated whose one surface is in contact with the other surface of the bonding layer 30, the second adhesive layer 32, and the second support 42 are placed in this order is obtained.

<Method of Manufacturing Stack Including Opening Portion in Support>

A method of manufacturing a stack including an opening portion in a support is described with reference to FIGS. 11A1 to 11D-2.

FIGS. 11A1 to 11D2 illustrate the method of manufacturing a stack including an opening portion which exposes part of a layer to be separated in a support. Cross-sectional views illustrating structures of the stack are shown on the left side of FIGS. 11A1 to 11D2, and top views corresponding to the cross-sectional views are shown on the right side.

FIGS. 11A1 to 11B2 illustrate a method of manufacturing a stack 92c comprising an opening portion by using a second support 42b which is smaller than the first support 41b.

FIGS. 11C1 to 11D2 illustrate a method of manufacturing a stack 92d comprising an opening portion formed in the second support 42.

<<Example 1 of Method of Manufacturing Stack Comprising an Opening Portion in Support>>

A method of manufacturing a stack has the same step as the above ninth step except that the second support 42b which is smaller than the first support 41b is used instead of the second support 42. By this method, a stack in which part of the second layer S3 to be separated is exposed can be manufactured (see FIGS. 11A1 and 11A2).

As the second adhesive layer 32, a liquid adhesive can be used. Alternatively, an adhesive whose fluidity is inhibited and which is formed in a single wafer shape in advance (also referred to as a sheet-like adhesive) can be used. By using the sheet-like adhesive, the amount of part of the adhesive layer 32 which extends beyond the second support 42b can be small. In addition, the adhesive layer 32 can have a uniform thickness easily.

Part of the exposed part of the second layer S3 to be separated is cut off, and the first layer F3 to be separated may be exposed (see FIGS. 11B1 and 11B2).

Specifically, with a blade or the like which has a sharp tip, a slit is formed in the exposed second layer S3 to be separated. Then, for example, an adhesive tape or the like is attached to part of the exposed second layer S3 to be separated to concentrate stress near the slit, and the part of the exposed second layer S3 to be separated is separated together with the attached tape or the like, whereby the part of the second layer S3 to be separated can be selectively removed.

Moreover, a layer which can suppress the bonding power of the bonding layer 30 to the first layer F3 to be separated may be selectively formed on part of the first layer F3 to be separated. For example, a material which is not easily bonded to the bonding layer 30 may be selectively formed. Specifically, an organic material may be deposited into an island shape. Thus, part of the bonding layer 30 can be selectively removed together with the second layer S3 to be separated easily. As a result, the first layer F3 to be separated can be exposed.

Note that for example, in the case where the first layer F3 to be separated includes a functional layer and a conductive layer F3b electrically connected to the functional layer, the conductive layer F3b can be exposed in an opening portion in the second stack 92c. Thus, the conductive layer F3b exposed in the opening portion can be used as a terminal supplied with a signal.

As a result, the conductive layer F3b part of which is exposed in the opening portion can be used as a terminal that can extract a signal supplied though the functional layer, or can be used as a terminal to which a signal supplied to the functional layer can be supplied by an external device.

<<Example 2 of Method of Manufacturing Stack Comprising Opening Portion in Support>>

A mask 48 comprising an opening portion formed to overlap with an opening portion formed in the second support 42 is formed on the stack 92. Next, a solvent 49 is dropped into the opening portion in the mask 48. Thus, with the solvent 49, the second support 42 exposed in the opening portion in the mask 48 can be swelled or dissolved (see FIGS. 11C1 and 11C2).

After the extra solvent 49 is removed, stress is applied by, for example, rubbing the second support 42 exposed in the opening portion in the mask 48. Thus, the second support 42 or the like in a portion overlapping with the opening portion in the mask 48 can be removed.

Moreover, with a solvent with which the bonding layer 30 is swelled or dissolved, the first layer F3 to be separated can be exposed (see FIGS. 11D1 and 11D2).

This embodiment can be combined with any of the other embodiments described in this specification as appropriate.

(Embodiment 8)

In this embodiment, a structure of a processed member that can be processed into the input device or input/output device of one embodiment of the present invention is described with reference to FIGS. 12A1 to 12B2.

FIGS. 12A1 to 12B2 are schematic views illustrating a structure of a processed member that can be processed into the stack.

FIG. 12A1 is a cross-sectional view illustrating a structure of the processed member 80 which can processed into the stack, and FIG. 12A2 is a top view corresponding to the cross-sectional view.

FIG. 12B1 is a cross-sectional view illustrating a structure of the processed member 90 which can processed into the stack, and FIG. 12B2 is a top view corresponding to the cross-sectional view.

<1. Structure Example 1 of Processed Member>

The processed member 80 includes a first substrate F1, the first separation layer F2 on the first substrate F1, the first layer F3 to be separated whose one surface is in contact with the first separation layer F2, the bonding layer 30 whose one surface is in contact with the other surface of the first layer F3 to be separated, and the base layer S5 in contact with the other surface of the bonding layer 30 (see FIGS. 12A1 and 12A2).

Note that the separation starting points F3s may be formed in the vicinity of the edges of the bonding layer 30.

<<First Substrate>>

There is no particular limitation on the first substrate F1 as long as it has heat resistance high enough to withstand a manufacturing process and a thickness and a size which can be used in a manufacturing apparatus.

For the first substrate F1, an organic material, an inorganic material, a composite material of an organic material and an inorganic material, or the like can be used.

For example, an inorganic material such as glass, ceramic, or metal, can be used for the first substrate F1.

Specifically, non-alkali glass, soda-lime glass, potash glass, crystal glass, or the like can be used for the first substrate F1.

Specifically, a metal oxide film, a metal nitride film, a metal oxynitride film, or the like can be used for the first substrate F1. For example, silicon oxide, silicon nitride, silicon oxynitride, an alumina film, or the like can be used for the first substrate F1.

Specifically, SUS, aluminum, or the like can be used for the first substrate F1.

For example, an organic material such as a resin, a resin film, or a plastic can be used for the first substrate F1.

Specifically, a resin film or a resin plate of polyester, polyolefin, polyamide, polyimide, polycarbonate, an acrylic resin, or the like can be used for the first substrate F1.

For example, a composite material such as a resin film to which a metal plate, a thin glass plate, or a film of an inorganic material is attached can be used as the first substrate F1.

For example, a composite material formed by dispersing a fibrous or particulate metal, glass, inorganic material, or the like into a resin film can be used as the first substrate F1.

For example, a composite material formed by dispersing a fibrous or particulate resin, organic material, or the like into an inorganic material can be used as the first substrate F1.

For the first substrate F1, a single-layer material or a stacked-layer material in which a plurality of layers are stacked can be used. For example, a stacked-layer material in which a base layer, an insulating layer that prevents diffusion of impurities contained in the base layer, and the like are stacked can be used for the first substrate F1.

Specifically, a stacked-layer material in which glass and one or a plurality of films that prevents diffusion of impurities contained in the glass and that are selected from a silicon oxide film, a silicon nitride film, a silicon oxynitride film, and the like are stacked can be used for the first substrate F1.

Alternatively, a stacked-layer material in which a resin and a film that prevents diffusion of impurities contained in the resin, such as a silicon oxide film, a silicon nitride film, and a silicon oxynitride film are stacked can be used for the first substrate F1.

<<First Separation Layer>>

The first separation layer F2 is provided between the first substrate F1 and the first layer F3 to be separated. In the vicinity of the first separation layer F2, a boundary where the first layer F3 to be separated can be separated from the first substrate F1 is formed. There is no particular limitation on the first separation layer F2 as long as it has heat resistance high enough to withstand the manufacturing process of the first layer F3 to be separated formed thereon.

For the first separation layer F2, for example, an inorganic material, an organic resin, or the like can be used.

Specifically, an inorganic material such as a metal containing an element selected from tungsten, molybdenum, titanium, tantalum, niobium, nickel, cobalt, zirconium, zinc, ruthenium, rhodium, palladium, osmium, iridium, and silicon, an alloy containing the element, or a compound containing the element can be used for the first separation layer F2.

Specifically, an organic material such as polyimide, polyester, polyolefin, polyamide, polycarbonate, or an acrylic resin can be used.

For example, a single-layer material or a stacked-layer material in which a plurality of layers are stacked can be used for the first separation layer F2.

Specifically, a material in which a layer containing tungsten and a layer containing an oxide of tungsten are stacked can be used for the first separation layer F2.

The layer containing an oxide of tungsten can be formed by a method in which another layer is stacked on a layer containing tungsten. Specifically, the layer containing an oxide of tungsten may be formed by a method in which silicon oxide, silicon oxynitride, or the like is stacked on a layer containing tungsten.

The layer containing an oxide of tungsten may be formed by subjecting a surface of a layer containing tungsten to thermal oxidation treatment, oxygen plasma treatment, nitrous oxide ($N_2O$) plasma treatment, treatment with a solution with high oxidizing power (e.g., ozone water), or the like.

Specifically, a layer containing polyimide can be used as the first separation layer F2. The layer containing polyimide has heat resistance high enough to withstand the various manufacturing steps required to form the first layer F3 to be separated.

For example, the layer containing polyimide has heat resistance of 200° C. or higher, preferably 250° C. or higher, more preferably 300° C. or higher, still more preferably 350° C. or higher.

By heating a film containing a monomer formed on the first substrate F1, a film containing polyimide obtained by condensation of the monomer can be used.

<<First Layer to be Separated>>

There is no particular limitation on the first layer F3 to be separated as long as it can be separated from the first substrate F1 and has heat resistance high enough to withstand the manufacturing process.

The boundary where the first layer F3 to be separated can be separated from the first substrate F1 may be formed between the first layer F3 to be separated and the first separation layer F2 or may be formed between the first separation layer F2 and the first substrate F1.

In the case where the boundary is formed between the first layer F3 to be separated and the first separation layer F2, the first separation layer F2 is not included in the stack. In the case where the boundary is formed between the first separation layer F2 and the first substrate F1, the first separation layer F2 is included in the stack.

An inorganic material, an organic material, a single-layer material, a stacked-layer material in which a plurality of layers are stacked, or the like can be used for the first layer F3 to be separated.

For example, an inorganic material such as a metal oxide film, a metal nitride film, or a metal oxynitride film can be used for the first layer F3 to be separated.

Specifically, silicon oxide, silicon nitride, silicon oxynitride, an alumina film, or the like can be used for the first layer F3 to be separated.

Specifically, a resin, a resin film, plastic, or the like can be used for the first layer F3 to be separated.

Specifically, a polyimide film or the like can be used for the first layer F3 to be separated.

For example, a material having a structure in which a functional layer overlapping with the first separation layer F2 and an insulating layer that is provided between the first separation layer F2 and the functional layer and can prevent unintended diffusion of impurities which impairs the function of the functional layer are stacked can be used.

Specifically, a 0.7-mm-thick glass plate is used as the first substrate F1, and a stacked-layer material in which a 200-nm-thick silicon oxynitride film and a 30-nm-thick tungsten film are stacked in this order from the first substrate F1 side is used for the first separation layer F2. In addition, a film including a stacked-layer material in which a 600-nm-thick silicon oxynitride film and a 200-nm-thick silicon nitride film are stacked in this order from the first separation layer F2 side can be used as the first layer F3 to be separated. Note that a silicon oxynitride film refers to a film that includes more oxygen than nitrogen, and a silicon nitride oxide film refers to a film that includes more nitrogen than oxygen.

Specifically, instead of the above first layer F3 to be separated, a film including a stacked-layer material of a 600-nm-thick silicon oxynitride film, a 200-nm-thick silicon nitride film, a 200-nm-thick silicon oxynitride film, a 140-nm-thick silicon nitride oxide film, and a 100-nm-thick silicon oxynitride film stacked in this order from the first separation layer F2 side can be used as the first layer F3 to be separated.

Specifically, a stacked-layer material in which a polyimide film, a layer containing silicon oxide, silicon nitride, or the like and the functional layer are stacked in this order from the first separation layer F2 side can be used.

<<Functional Layer>>

The functional layer is included in the first layer F3 to be separated.

For example, a functional circuit, a functional element, an optical element, a functional film, or a layer including a plurality of elements selected from these can be used as the functional layer.

Specifically, a display element that can be used for a display device, a pixel circuit driving the display element, a driver circuit driving the pixel circuit, a color filter, a moisture-proof film, and the like, and a layer including two or more selected from these can be given.

<<Bonding Layer>>

There is no particular limitation on the bonding layer 30 as long as it bonds the first layer F3 to be separated and the base layer S5 to each other.

For the bonding layer 30, an inorganic material, an organic material, a composite material of an inorganic material and an organic material, or the like can be used.

For example, a glass layer with a melting point of 400° C. or lower, preferably 300° C. or lower, an adhesive, or the like can be used.

For example, an organic material such as a light curable adhesive, a reactive curable adhesive, a thermosetting adhesive, and/or an anaerobic adhesive can be used for the bonding layer 30.

Specifically, an adhesive containing an epoxy resin, an acrylic resin, a silicone resin, a phenol resin, a polyimide resin, an imide resin, a polyvinyl chloride (PVC) resin, a polyvinyl butyral (PVB) resin, and an ethylene vinyl acetate (EVA) resin, or the like can be used.

<<Base Layer>>

There is no particular limitation on the base layer S5 as long as it has heat resistance high enough to withstand a manufacturing process and a thickness and a size which can be used in a manufacturing apparatus.

A material that can be used for the base layer S5 can be the same as that of the first substrate F1, for example.

<<Separation Starting Point>>

In the processed member 80, the separation starting point F3s may be formed in the vicinity of the edges of the bonding layer 30.

The separation starting point F3s is formed by separating part of the first layer F3 to be separated, from the first substrate F1.

Part of the first layer F3 to be separated can be separated from the separation layer F2 by inserting a sharp tip into the first layer F3 to be separated, from the first substrate F1 side, or by a method using a laser or the like (e.g., a laser ablation method).

Thus, the separation starting point F3s can be formed.

<Structural Example 2 of Processed Member>

A structure of the processed member that can be the stack and is different from the above is described with reference to FIGS. 12B1 and 12B2.

The processed member 90 is different from the processed member 80 in that the other surface of the bonding layer 30 is in contact with one surface of the second layer S3 to be separated instead of the material S5.

Specifically, the processed member 90 includes the first substrate F1 on which the first separation layer F2 and the first layer F3 to be separated whose one surface is in contact with the first separation layer F2 are formed, the second substrate S1 on which the second separation layer S2 and the second layer S3 to be separated whose other surface is in contact with the second separation layer S2 are formed, and the bonding layer 30 whose one surface is in contact with the other surface of the first layer F3 to be separated and whose other surface is in contact with the one surface of the second layer S3 to be separated (see FIGS. 12B1 and 12B2).

<<Second Substrate>>

As the second substrate S1, a substrate similar to the first substrate F1 can be used. Note that the second substrate S1 does not necessarily have the same structure as the first substrate F1.

<<Second Separation Layer>>

For the second separation layer S2, a structure similar to that of the first separation layer F2 can be used. For the second separation layer S2, a structure different from that of the first separation layer F2 can also be used.

<<Second Layer to be Separated>>

As the second layer S3 to be separated, a structure similar to that of the first layer F3 to be separated can be used. For the second layer S3 to be separated, a structure different from that of the first layer F3 to be separated can also be used.

Specifically, a structure may be employed in which the first layer F3 to be separated includes a functional circuit and the second layer S3 to be separated includes a functional layer that prevents diffusion of impurities into the functional circuit.

Specifically, a structure may be employed in which the first layer F3 to be separated includes a light-emitting element that emits light to the second layer S3 to be separated, a pixel circuit driving the light-emitting element, and a driver circuit driving the pixel circuit, and the second layer S3 to be separated includes a color filter that transmits part of light emitted from the light-emitting element and a moisture-proof film that prevents diffusion of impurities into the light-emitting element. Note that the processed member with such a structure can be used for a stack that can be used as a flexible display device.

This embodiment can be combined with any of the other embodiments described in this specification as appropriate.

(Embodiment 9)

In this embodiment, the structure of a data processing device that can be formed using the input/output device of one embodiment of the present invention is described with reference to FIGS. 13A to 13C.

Figure 13A:
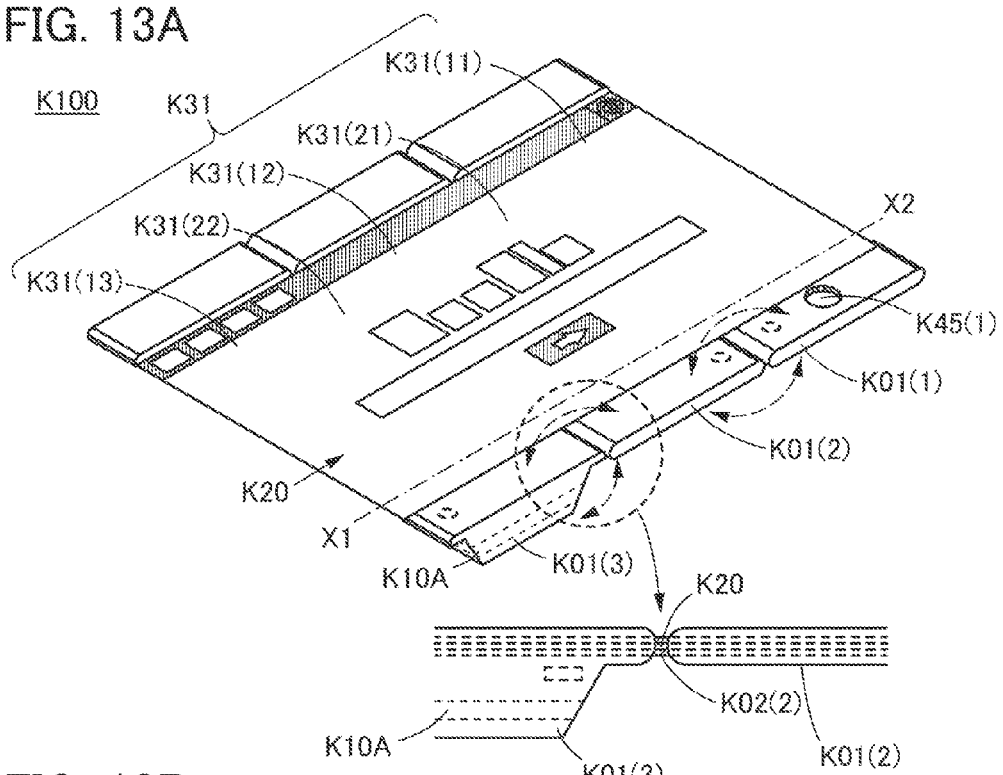
FIGS. 13A to 13C are projection views illustrating a structure of a data processing device according to one embodiment.
Figure 13B:
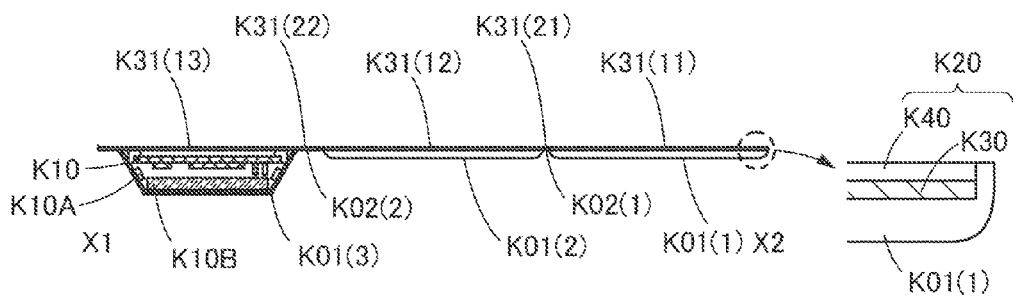
Figure 13C:
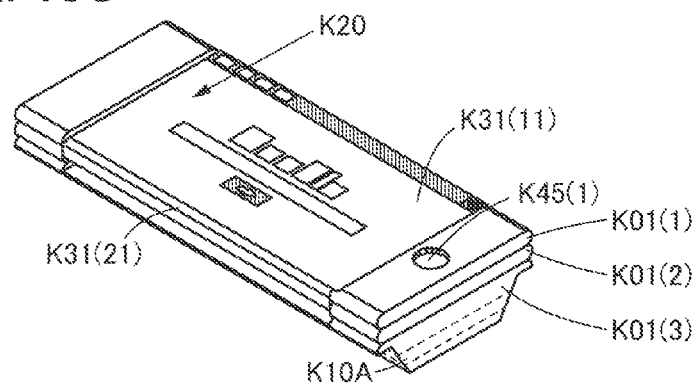

FIGS. 13A to 13C illustrate the data processing device of one embodiment of the present invention.

FIG. 13A is a projection view illustrating an input/output device K20 of a data processing device K100 of one embodiment of the present invention which is unfolded. FIG. 13B is a cross-sectional view illustrating a cross-sectional view of the data processing device K100 along the cutting-plane line X1-X2 in FIG. 13A. FIG. 13C is a projection view illustrating the input/output device K20 which is folded.

<Example of Structure of Data Processing Device>

The data processing device K100 described in this embodiment includes the input/output device K20, an arithmetic device K10, housings K01(1) to K01(3) (see FIGS. 13A to 13C).

<<Input/Output Device>>

The input/output device K20 includes a display portion K30 and an input device K40. The display portion K30 is supplied with image data V and the input device K40 supplies sensing data S (see FIG. 13B).

The input/output device K20 includes the input device K40 and the display portion K30 including a region overlapping with the input device K40. Note that the input/output device K20 serves not only as the display portion K30 but also as the input device K40. The input/output device K20 using a touch sensor as the input device K40 and a display panel as the display portion K30 can be referred to as a touch panel.

Specifically, the input/output device 500 described in Embodiment 4 can be used as the input/output device K20.

<<Display Portion>>

The display portion K30 includes a region K31 where a first region K31(11), a first bendable region K31(21), a second region K31(12), a second bendable region K31(22), and a third region K31(13) are arranged in stripes in this order (see FIG. 13A).

The display portion K30 can be folded and unfolded along a first fold line formed in the first bendable region K31(21) and a second fold line formed in the second bendable region K31(22) (see FIGS. 13A and 13C).

<<Arithmetic Device>>

The arithmetic device K10 includes an arithmetic unit and a storage unit that stores a program to be executed by the arithmetic unit. The arithmetic device supplies the image data V and is supplied with the sensing data S.

<<Housings>>

The housings include the housing K01(1), a hinge K02(1), the housing K01(2), a hinge K02(2), and the housing K01(3) which are placed in this order.

In the housing K01(3), the arithmetic device K10 is stored. The housings K01(1) to K01(3) hold the input/output device K20, and enable the input/output device K20 to be folded and unfolded (see FIG. 13B).

In this embodiment, the data processing device including the three housings and the two hinges connecting the three housings is given as an example. The input/output device K20 can be bent and folded at two positions where the hinges are placed.

Note that n (n is a natural number greater than or equal to 2) housings can be connected using (n−1) hinges. Thus, the input/output device K20 can be bent and folded at (n−1) positions.

The housing K01(1) includes a region overlapping with the first region K31(11) and a button K45(1).

The housing K01(2) includes a region overlapping with the second region K31(12).

The housing K01(3) includes a region overlapping with the third region K31(13) and a region in which the arithmetic device K10, an antenna K10A, and a battery K10B are stored.

The hinge K02(1) includes a region overlapping with the first bendable region K31(21) and connects the housing K01(1) and the housing K01(2) such that the housing K01(1) can be rotated with respect to the housing K01(2).

The hinge K02(2) includes a region overlapping with the second bendable region K31(22) and connects the housing K01(2) and the housing K01(3) such that the housing K01(2) can be rotated with respect to the housing K01(3).

The antenna K10A is electrically connected to the arithmetic device K10 and supplies a signal or is supplied with a signal.

In addition, the antenna K10A is wirelessly supplied with power from an externally placed device and supplies power to the battery K10B.

The battery K10B supplies power and the arithmetic device K10 is supplied with power.

Note that a folding sensor having a function of determining whether the housing is folded or unfolded and supplying data showing the state of the housing can be used. For example, the folding sensor can be placed in the housing K01(3), so that the data showing the state of the housing K01 can be supplied to the arithmetic device K10.

For example, the arithmetic device K10 to which the data showing the folded state of the housing K01 are supplied supplies the image data V to be displayed on the first region K31(11) (see FIG. 13C).

The arithmetic device K10 to which the data showing the unfolded state of the housing K01 are supplied supplies the image data V to be displayed on the region K31 of the display portion K30 (see FIG. 13A).

This embodiment can be combined with any of the other embodiments described in this specification as appropriate.

For example, in this specification and the like, an explicit description "X and Y are connected" means that X and Y are electrically connected, X and Y are functionally connected, and X and Y are directly connected. Accordingly, without being limited to a predetermined connection relation, for example, a connection relation shown in drawings or texts, another connection relation is included in the drawings or the texts.

Here, X and Y each denote an object (e.g., a device, an element, a circuit, a wiring, an electrode, a terminal, a conductive film, or a layer).

For example, in the case where X and Y are directly connected, X and Y are connected without an element that enables electrical connection between X and Y (e.g., a switch, a transistor, a capacitor, an inductor, a resistor, a diode, a display element, a light-emitting element, or a load) interposed between X and Y.

For example, in the case where X and Y are electrically connected, one or more elements that enable an electrical connection between X and Y (e.g., a switch, a transistor, a capacitor, an inductor, a resistor, a diode, a display element, a light-emitting element, or a load) can be connected between X and Y. Note that the switch is controlled to be turned on or off. That is, the switch is conducting or not conducting (is turned on or off) to determine whether current flows therethrough or not. Alternatively, the switch has a function of selecting and changing a current path. Note that the case where X and Y are electrically connected includes the case where X and Y are directly connected.

For example, in the case where X and Y are functionally connected, one or more circuits that enable functional connection between X and Y (e.g., a logic circuit such as an inverter, a NAND circuit, or a NOR circuit; a signal converter circuit such as a D/A converter circuit, an A/D converter circuit, or a gamma correction circuit; a potential level converter circuit such as a power supply circuit (e.g., a step-up circuit or a step-down circuit) or a level shifter circuit for changing the potential level of a signal; a voltage source; a current source; a switching circuit; an amplifier circuit such as a circuit that can increase signal amplitude, the amount of current, or the like, an operational amplifier, a differential amplifier circuit, a source follower circuit, and a buffer circuit; a signal generation circuit; a memory circuit; or a control circuit) can be connected between X and Y. For example, even when another circuit is interposed between X and Y, X and Y are functionally connected if a signal output from X is transmitted to Y. Note that the case where X and Y are functionally connected includes the case where X and Y are directly connected and X and Y are electrically connected.

Note that in this specification and the like, an explicit description "X and Y are connected" means that X and Y are electrically connected (i.e., the case where X and Y are connected with another element or circuit provided therebetween), X and Y are functionally connected (i.e., the case where X and Y are functionally connected with another circuit provided therebetween), and X and Y are directly connected (i.e., the case where X and Y are connected without another element or circuit provided therebetween). That is, in this specification and the like, the explicit expression "X and Y are electrically connected" is the same as the explicit simple expression "X and Y are connected".

Note that, for example, the case where a source (or a first terminal or the like) of a transistor is electrically connected to X through (or not through) Z1 and a drain (or a second terminal or the like) of the transistor is electrically connected to Y through (or not through) Z2, or the case where a source (or a first terminal or the like) of a transistor is directly connected to a part of Z1 and another part of Z1 is directly connected to X while a drain (or a second terminal or the like) of the transistor is directly connected to a part of Z2 and another part of Z2 is directly connected to Y, can be expressed by using any of the following expressions.

The expressions include, for example, "X, Y, a source (or a first terminal or the like) of a transistor, and a drain (or a second terminal or the like) of the transistor are electrically connected to each other, and X, the source (or the first terminal or the like) of the transistor, the drain (or the second terminal or the like) of the transistor, and Y are electrically connected to each other in this order", "a source (or a first terminal or the like) of a transistor is electrically connected to X a drain (or a second terminal or the like) of the transistor is electrically connected to Y, and X the source (or the first terminal or the like) of the transistor, the drain (or the second terminal or the like) of the transistor, and Y are electrically connected to each other in this order", and "X is electrically connected to Y through a source (or a first terminal or the like) and a drain (or a second terminal or the like) of a transistor, and X the source (or the first terminal or the like) of the transistor, the drain (or the second terminal or the like) of the transistor, and Y are provided to be connected in this order". When the connection order in a circuit configuration is defined by an expression similar to the above examples, a source (or a first terminal or the like) and a drain (or a second terminal or the like) of a transistor can be distinguished from each other to specify the technical scope.

Other examples of the expressions include, "a source (or a first terminal or the like) of a transistor is electrically connected to X through at least a first connection path, the first connection path does not include a second connection path, the second connection path is a path between the source (or the first terminal or the like) of the transistor and a drain (or a second terminal or the like) of the transistor, Z1 is on the first connection path, the drain (or the second terminal or the like) of the transistor is electrically connected to Y through at least a third connection path, the third connection path does not include the second connection path, and Z2 is on the third connection path". It is also possible to use the expression "a source (or a first terminal or the like) of a transistor is electrically connected to X through at least Z1 on a first connection path, the first connection path does not include a second connection path, the second connection path includes a connection path through the transistor, a drain (or a second terminal or the like) of the transistor is electrically connected to Y through at least Z2 on a third connection path, and the third connection path does not include the second connection path". Still another example of the expression is "source (or a first terminal or the like) of a transistor is electrically connected to X through at least Z1 on a first electrical path, the first electrical path does not include a second electrical path, the second electrical path is an electrical path from the source (or the first terminal or the like) of the transistor to a drain (or a second terminal or the like) of the transistor, the drain (or the second terminal or the like) of the transistor is electrically connected to Y through at least Z2 on a third electrical path, the third electrical path does not include a fourth electrical path, and the fourth electrical path is an electrical path from the drain (or the second terminal or the like) of the transistor to the source (or the first terminal or the like) of the transistor". When the connection path in a circuit structure is defined by an expression similar to the above examples, a source (or a first terminal or the like) and a drain (or a second terminal or the like) of a transistor can be distinguished from each other to specify the technical scope.

Note that these expressions are only examples and one embodiment of the present invention is not limited to the expressions. Here, X, Y, Z1, and Z2 each denote an object (e.g., a device, an element, a circuit, a wiring, an electrode, a terminal, a conductive film, and a layer).

Even when independent components are electrically connected to each other in a circuit diagram, one component has functions of a plurality of components in some cases. For example, when part of a wiring also functions as an electrode, one conductive film functions as the wiring and the electrode. Thus, "electrical connection" in this specification includes in its category such a case where one conductive film has functions of a plurality of components.

This application is based on Japanese Patent Application serial no. 2014-050743 filed with the Japan Patent Office on Mar. 13, 2014, the entire contents of which are hereby incorporated by reference.

What is claimed is:

1. An input or output device comprising:
a sensor unit comprising a first sensing element, a second sensing element, a transistor, a first switch, a second switch and a third switch; and
a pixel comprising a light-emitting element,
wherein the first sensing element comprises a first electrode, a second electrode, and an insulating layer between the first electrode and the second electrode,
wherein the second sensing element comprises a photoelectric conversion element,
wherein a first terminal of the first switch is electrically connected to an electrode of the transistor,
wherein a second terminal of the first switch is electrically connected to a first wiring,
wherein a first terminal of the second switch is electrically connected to a gate of the transistor,
wherein a second terminal of the second switch is electrically connected to a second wiring,
wherein a first terminal of the third switch is electrically connected to the gate of the transistor,
wherein a second terminal of the third switch is electrically connected to an electrode of the second sensing element,
wherein the first electrode of the first sensing element is electrically connected to the gate of the transistor, and
wherein the first sensing element and the light-emitting element overlap each other.

2. An input or output device comprising:
a sensor unit comprising a first sensing element, a second sensing element, a capacitor, a transistor, a first switch, a second switch, a third switch and a fourth switch; and
a pixel comprising a light-emitting element,
wherein the first sensing element comprises a first electrode, a second electrode, and an insulating layer between the first electrode and the second electrode,
wherein the second sensing element comprises a photoelectric conversion element, wherein a first terminal of the first switch is electrically connected to an electrode of the transistor, wherein a second terminal of the first switch is electrically connected to a first wiring, wherein a first terminal of the second switch is electrically connected to a gate of the transistor, wherein a second terminal of the second switch is electrically connected to a second wiring, wherein a first terminal of the third switch is electrically connected to the gate of the transistor, wherein a second terminal of the third switch is electrically connected to an electrode of the second sensing element, wherein a first terminal of the fourth switch is electrically connected to the gate of the transistor, wherein a second terminal of the fourth switch is electrically connected to the first electrode of the first sensing element, wherein an electrode of the capacitor is electrically connected to the second terminal of the third switch, and wherein the first sensing element and the light-emitting element overlap each other.

3. The input or output device according to claim 2, further comprising a coloring layer between the sensor unit and the pixel.

4. An input device comprising:
a first sensing element comprising a first electrode, a second electrode, and an insulating layer between the first electrode and the second electrode;
a second sensing element comprising a photoelectric conversion element; and
a sensing circuit comprising:
  a first transistor comprising a gate electrically connected to the first electrode of the first sensing element and a first electrode electrically connected to a first wiring;
  a first switch comprising a control terminal electrically connected to a second wiring, a first terminal electrically connected to a second electrode of the first transistor, and a second terminal electrically connected to a third wiring;
  a second switch comprising a control terminal electrically connected to a fourth wiring, a first terminal electrically connected to the first electrode of the first sensing element, and a second terminal electrically connected to a fifth wiring; and
  a third switch comprising a control terminal electrically connected to a sixth wiring and a first terminal electrically connected to the first electrode of the first sensing element,
wherein the second sensing element comprises a first electrode electrically connected to a second terminal of the third switch and a second electrode electrically connected to the first wiring.

5. The input device according to claim 4,
wherein a ground potential is supplied through the first wiring,
wherein a selection signal is be supplied through the second wiring,
wherein a sensing signal is supplied through the third wiring,
wherein a reset signal is supplied through the fourth wiring,
wherein a potential at which the first transistor is turned on can be supplied through the fifth wiring, and
wherein a light exposure control signal can be supplied through the sixth wiring.

6. The input device according to claim 4,
wherein the sensing circuit is configured to be supplied with a selection signal through the second wiring and to supply a sensing signal through the third wiring based on a change in parasitic capacitance of the first sensing element or on current flowing through the second sensing element.

7. An input device comprising:
a first sensing element comprising a first electrode, a second electrode, and an insulating layer between the first electrode and the second electrode;
a second sensing element comprising a photoelectric conversion element; and
a sensing circuit comprising:
  a first transistor comprising a first electrode electrically connected to a first wiring;
  a first switch comprising a control terminal electrically connected to a second wiring, a first terminal electrically connected to a second electrode of the first transistor, and a second terminal electrically connected to a third wiring;
  a second switch comprising a control terminal electrically connected to a fourth wiring, a first terminal electrically connected to a gate of the first transistor, and a second terminal electrically connected to a fifth wiring;
  a third switch comprising a control terminal electrically connected to a sixth wiring and a first terminal electrically connected to the gate of the first transistor;
  a fourth switch comprising a control terminal electrically connected to a seventh wiring and a first terminal electrically connected to the gate of the first transistor; and
  a capacitor comprising a first electrode electrically connected to a second terminal of the third switch and a second electrode electrically connected to an eighth wiring,
wherein the first electrode of the first sensing element is electrically connected to a second terminal of the fourth switch and the second electrode of the first sensing element is electrically connected to the eighth wiring, and
wherein the second sensing element comprises a first electrode electrically connected to the second terminal of the third switch and a second electrode electrically connected to the first wiring.

8. The input device according to claim 7,
wherein a ground potential is supplied through the first wiring,
wherein a selection signal is supplied through the second wiring,
wherein a sensing signal is supplied through the third wiring,
wherein a reset signal is supplied through the fourth wiring,
wherein a potential at which the first transistor is turned on can be supplied through the fifth wiring,
wherein a light exposure control signal is supplied through the sixth wiring,
wherein a mode switching signal is supplied through the seventh wiring, and
wherein the ground potential is supplied through the eighth wiring.

9. The input device according to claim 7,
wherein the sensing circuit is configured to be supplied with a selection signal through the second wiring and to supply a sensing signal through the third wiring based on a change in parasitic capacitance of the first sensing element or on current flowing through the second sensing element.

* * * * *